United States Patent [19]
Yoshizaki et al.

[11] Patent Number: 5,444,978
[45] Date of Patent: Aug. 29, 1995

[54] CATALYST WARMING UP DEVICE OF AN INTERNAL COMBUSTION ENGINE

[75] Inventors: Kouji Yoshizaki, Numazu; Hiroshi Tanaka, Susono, both of Japan

[73] Assignee: Toyota Jidosha Kabushiki Kaisha, Toyota, Japan

[21] Appl. No.: 209,019

[22] Filed: Mar. 11, 1994

[30] Foreign Application Priority Data

Mar. 15, 1993 [JP] Japan .................................. 5-054047
Jun. 29, 1993 [JP] Japan .................................. 5-158850

[51] Int. Cl.⁶ ............................................ F01N 3/20
[52] U.S. Cl. ................................. 60/276; 60/277; 60/284; 60/289; 60/300
[58] Field of Search ............... 60/276, 277, 284, 300, 60/289

[56] References Cited

U.S. PATENT DOCUMENTS

| 3,723,070 | 3/1973 | Houdry . | |
|---|---|---|---|
| 5,257,501 | 11/1993 | Wataya | 60/284 |
| 5,265,418 | 11/1993 | Smith | 60/284 |

FOREIGN PATENT DOCUMENTS

| 13820 | 2/1979 | Japan | 60/284 |
|---|---|---|---|
| 63-111256 | 5/1988 | Japan . | |
| 63-212750 | 9/1988 | Japan . | |
| 5-55940 | 3/1993 | Japan . | |
| 5-98951 | 4/1993 | Japan . | |

*Primary Examiner*—Douglas Hart
*Attorney, Agent, or Firm*—Oliff & Berridge

[57] ABSTRACT

A catalyst warming up device of an internal combustion engine includes an electrically heated type catalyst disposed in an exhaust gas passage of the engine and a unit for supplying secondary air into the exhaust gas passage at an upstream of the catalyst. The secondary air supply and the catalyst energization are controlled in such a manner that, during an engine warming up condition, in which an air-fuel ratio of a mixture introduced into engine cylinders is controlled to be rich, if the air-fuel ratio of the exhaust gas is detected as lean or the same as a theoretical air-fuel ratio due to the secondary air, the secondary air is supplied to the exhaust gas passage after the catalyst is energized, and if the air-fuel ratio of the exhaust gas cannot be controlled to lean or the same as a theoretical air-fuel ratio, an operation of the catalyst energization is stopped.

6 Claims, 23 Drawing Sheets

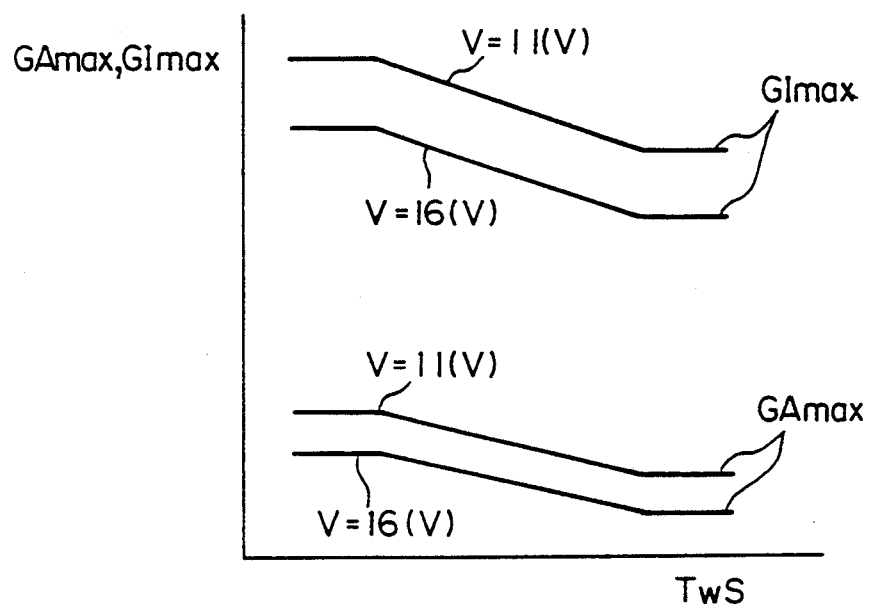

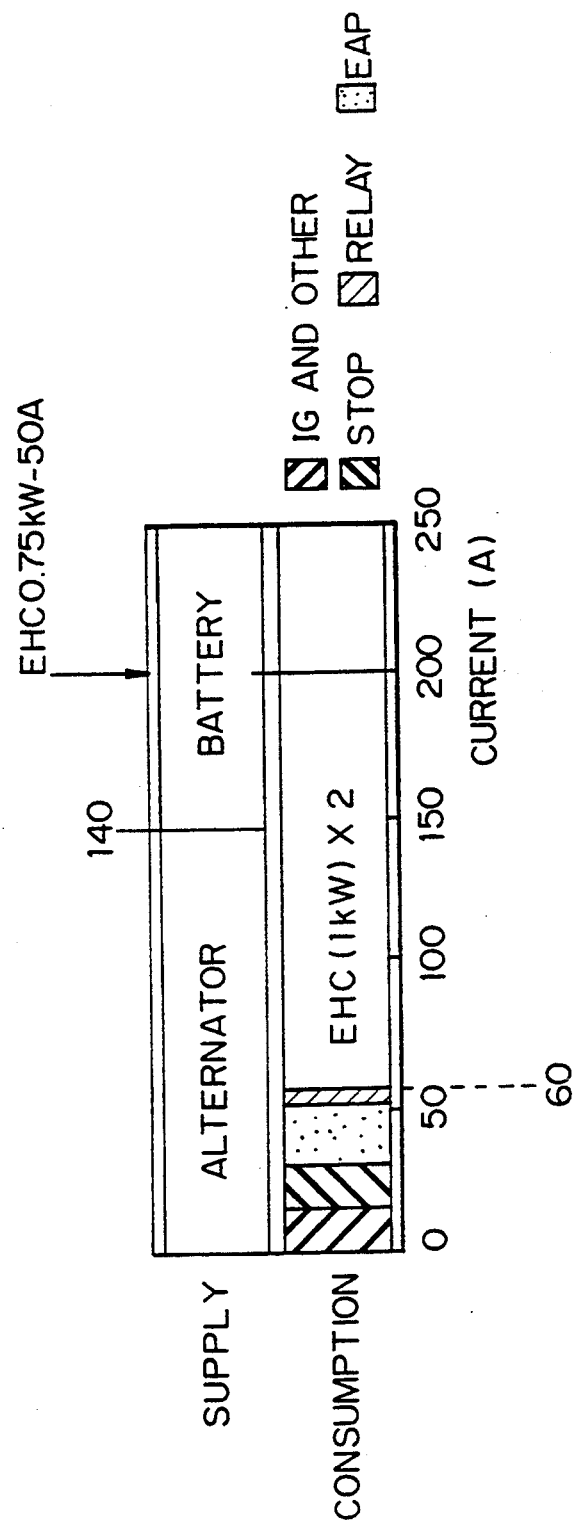

CATALYST WARMING UP DEVICE OF AN INTERNAL COMBUSTION ENGINE

BACKGROUND OF THE INVENTION

1. Filed of the invention

The present invention relates to a catalyst warming up device of an internal combustion engine.

2. Description of the Related Art

An internal combustion engine has been proposed, in which exhaust gas is purified in the following manner: In order to purify unburnt HC and CO gas as early as possible after the start of an internal combustion engine, an electrically heated type catalyst, which is disposed in an exhaust gas passage of the engine, is electrically energized with current right after the engine has been started. When the temperature of the catalyst has been raised to an activation temperature at which unburnt HC and CO gas is actively oxidized, secondary air is supplied into the exhaust gas passage in the upstream of the engine. Unburnt HC and CO gas is purified by this secondary air.

However, rich mixture is supplied into cylinders of the engine for some time after the start of the engine. Accordingly, even when the catalyst is heated to a temperature not less than the activation temperature of the catalyst, the unburnt HC and CO gas cannot be purified unless a sufficient amount of secondary air is supplied. In the following description, an air-fuel ratio is defined as a ratio of an amount of overall air supplied to a suction air passage of the engine and an exhaust gas passage in the upstream of the catalyst, to an amount of overall fuel. In the case where the air-fuel ratio is lean or the same as a theoretical air-fuel ratio when the catalyst is heated to a temperature not less than the activation temperature and a sufficient amount of secondary air is supplied, a sufficient amount of oxygen exists in the exhaust gas so as to burn unburnt HC and CO gas. Accordingly, the unburnt HC and CO gas is completely purified. However, in the case where the air-fuel ratio of the exhaust gas is rich, time, the sufficient amount of oxygen to burn unburnt HC and CO gas does not exist in the exhaust gas. Accordingly, the unburnt HC and CO gas can not be completely burnt.

In other words, as long as the air-fuel ratio of exhaust gas is rich, the unburnt HC and CO gas cannot be purified even when the catalyst is heated to the activation temperature. Consequently, even when the catalyst is electrically heated, electric power is wasted and no effect can be provided. Accordingly, when the catalyst is electrically heated after the start of the engine and secondary air is supplied to the exhaust passage in the above-mentioned internal combustion engine, electric power is wasted for heating the catalyst if the air-fuel ratio of exhaust gas is rich.

SUMMARY OF THE INVENTION

An object of the present invention is to provide a catalyst warming up device of an internal combustion engine, in which even if the air-fuel ratio of the exhaust gas is rich, electric power is prevented from being wasted.

Another object of the present invention is to provide a catalyst warming up device of an internal combustion engine, in which the drawbacks as mentioned above with reference to the prior art can be overcome.

According to the present invention, there is provided a catalyst warming up device of an internal combustion engine, said device comprising: an electrically heated type catalyst disposed in an exhaust gas passage of said engine; a secondary air supplying means for supplying secondary air into said exhaust gas passage at an upstream of said catalyst; a catalyst energizing means for energizing said catalyst with an electric current; an air-fuel ratio detecting means for detecting an air-fuel ratio of an exhaust gas; and controlling means for controlling said secondary air supplying means and said catalyst energizing means in such a manner that, during an engine warming up condition, in which an air-fuel ratio of a mixture introduced into engine cylinders is controlled to be rich, if the air-fuel ratio of the exhaust gas is detected as lean or the same as a theoretical air-fuel ratio due to the secondary air, the secondary air is supplied to said exhaust gas passage after said catalyst is energized, and if the air-fuel ratio of the exhaust gas cannot be controlled to lean or the same as a theoretical air-fuel ratio, an operation of said catalyst energizating means is stopped.

It is preferable that said device further comprises a detecting means for detecting an operation of said secondary air supplying means and, if said secondary air supplying means cannot be operated, an operation of said catalyst energizating means is stopped.

It is also preferable that, if the air-fuel ratio of the exhaust gas cannot be controlled to lean or the same as a theoretical air-fuel ratio, even if said secondary air is supplied from said secondary air supplying means into said exhaust gas passage, an operation of said catalyst energizating means is stopped.

According to another aspect of the present invention, there is provided a catalyst warming up device of an internal combustion engine of a vehicle: said engine comprising an electric circuit including a battery and an alternator for supplying electric current to electrical loads of said vehicle and electrically charging said battery; said catalyst warming up device comprising: a catalyst disposed in an exhaust gas passage of said engine; an electrically heating means for electrically heating said catalyst, said heating means is electrically connected to said electric circuit at a point nearer to said alternator than points at which said electrical loads are connected to said electric circuit, so that the electric current is supplied to said heating means from said alternator.

BRIEF DESCRIPTION OF THE DRAWINGS

FIG. 12 is a diagram showing the maximum suction air amounts $GA_{max}$ and $GI_{max}$;

FIGS. 13(A) and 13(B) are views showing a map of the maximum suction air amounts $GA_{max}$ and $GI_{max}$;

FIG. 26 is a schematic illustration showing the supply and consumption of current after ten seconds have passed from the start of the engine.

DETAILED DESCRIPTION OF THE PREFERRED EMBODIMENT

Figure 1:
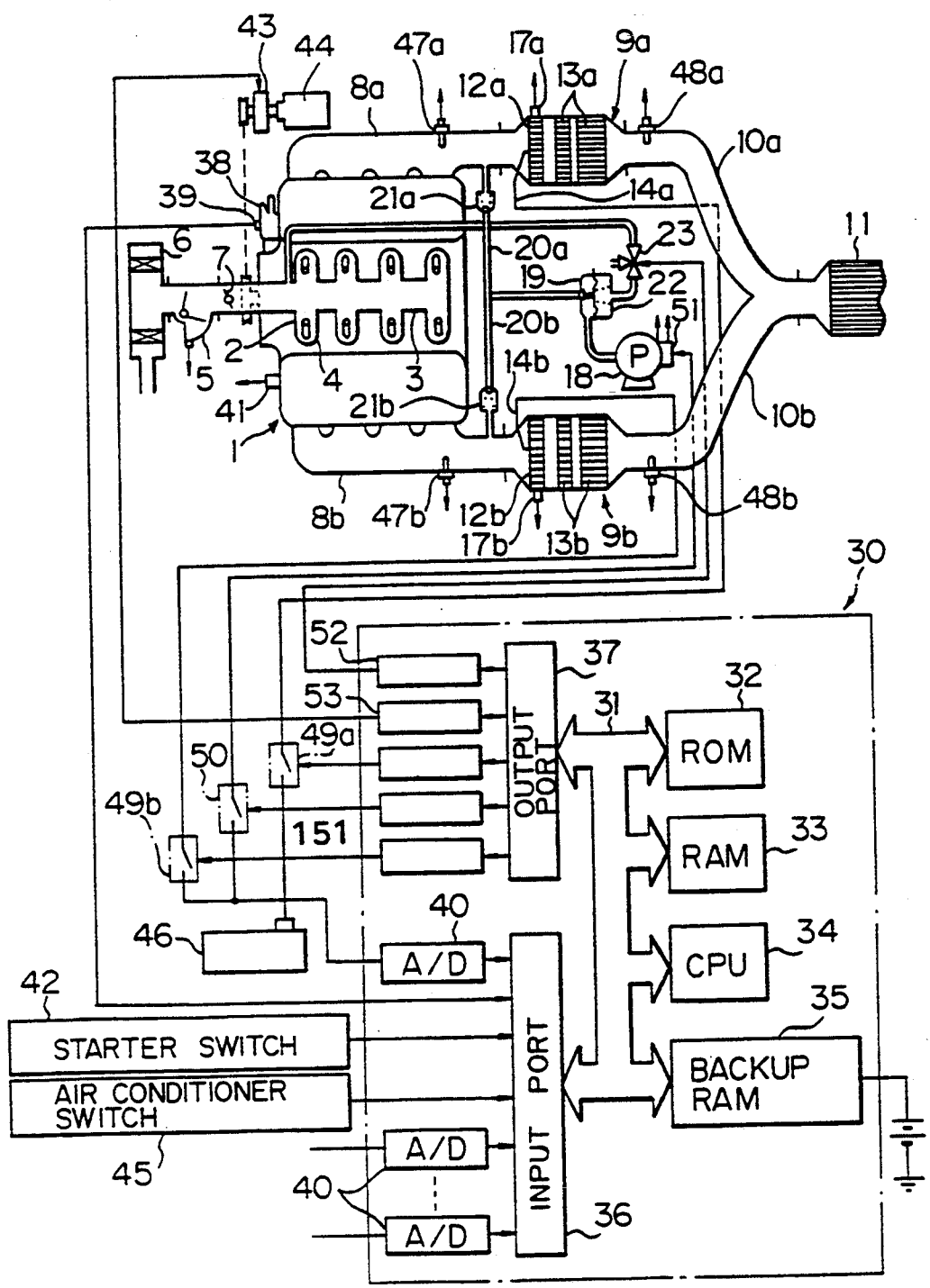
FIG. 1 is an overall arrangement view of the internal combustion engine.

FIG. 1 shows a V-type 8-cylinder internal combustion engine to which the present invention is applied.

Figure 2:
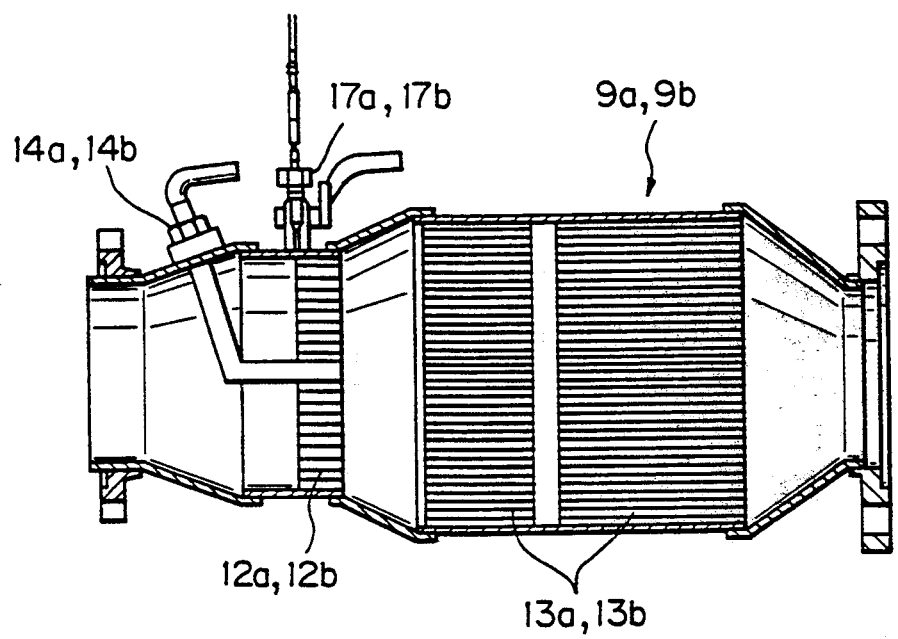
FIG. 2 is an enlarged sectional side view of the catalytic converter.

With reference to FIG. 1, each cylinder of the V-type 8-cylinder internal combustion engine 1 is connected to a common suction duct 3 through a corresponding suction branch pipe 2. Each suction branch pipe 2 is provided with a fuel injection valve 4 for injecting fuel toward a suction port of a corresponding cylinder. The suction duct 3 is connected to an air cleaner 6 through an air-flow meter 5, and a throttle valve 7 is disposed at an inlet portion of the suction duct 3. Also, this V-type 8-cylinder internal combustion engine includes a pair of exhaust manifolds 8a, 8b. The exhaust manifolds 8a, 8b are respectively connected to a common catalytic converter 11 through corresponding catalytic converters 9a, 9b and exhaust pipes 10a, 10b. The catalytic converters 9a, 9b are constructed in the same manner. As shown in FIG. 2, the catalytic converters 9a, 9b are composed of an electrically heated type three way catalysts 12a, 12b and a pair of primary three way catalysts 13a, 13b disposed in the downstream of the electrically heated type three way catalysts 12a, 12b.

Figure 3:
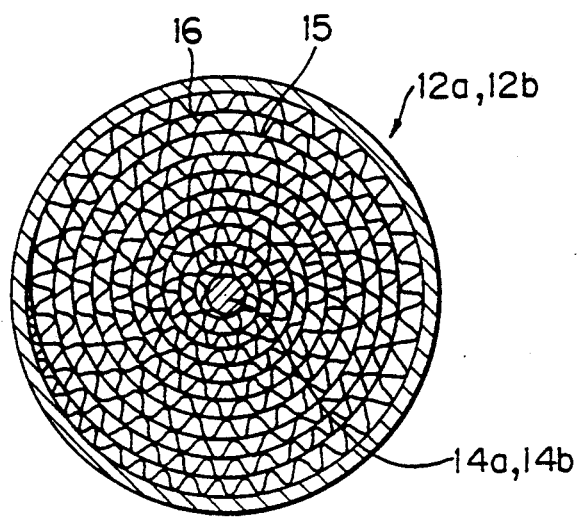
FIG. 3 is a sectional view of the electrically heated type catalyst.

As shown in FIG. 3, the electrically heated type three way catalysts 12a, 12b are composed of a metallic flat sheet 15 and a metallic corrugated sheet 16 which are alternately wound around central electrodes 14a, 14b. The three way catalyst is mounted on the metallic sheet 15 and metallic corrugated sheet 16. When a voltage is impressed upon the central electrodes 14a, 14b, an electrical current flows into the metallic sheet 15 and metallic corrugated sheet 16 from the center to the outside, so that the metallic flat sheet 15 and metallic corrugated sheet 16 are heated. In this way, the three way catalyst mounted on the metallic flat sheet 15 and metallic corrugated sheet 16 is heated. Consequently, the metallic flat sheet 15 and metallic corrugated sheet 16 function as a heater. In this connection, temperature sensors 17a, 17b are attached to the electrically heated type three way catalysts 12a, 12b for detecting the temperatures thereof.

As shown in FIG. 1, the internal combustion engine 1 is provided with a motor-driven air pump 18 for supplying secondary air. A delivery port of this air pump 18 is connected to a pair of branch pipes 20a, 20b for supplying secondary air, through a shut-off valve 19. The branch pipes 20a, 20b are respectively connected to the exhaust manifolds 8a, 8b disposed in the upstream of the corresponding catalytic converters 9a, 9b. In the branch pipes 20a, 20b, check valves 21a, 21b are disposed which can be communicated only with the corresponding exhaust manifolds 8a, 8b. A negative pressure diaphragm chamber 22 of the shut-off valve 19 is connected to the suction duct 3 in the downstream of the throttle valve 7 through a changeover valve 23 capable of being communicated with the atmospheric air. The negative pressure diaphragm chamber 22 is usually open to the atmospheric air through the changeover valve 23. At this time, the shut-off valve 19 is closed as shown in FIG. 1. On the other hand, when the negative pressure diaphragm chamber 22 is connected to the suction duct 3 by the changeover action of the changeover valve 23, the shut-off valve 19 is opened, and the secondary air discharged from the air pump 18 is supplied into the exhaust manifolds 8a, 8b.

An electronic control unit 30 is composed of a digital computer. The electronic control unit 30 includes a ROM (read-only-memory) 32, RAM (random access memory) 33, CPU (microprocessor) 34, backup RAM 35 connected to a power source at all times, inlet port 36, and output port 37 which are connected to each other through a bidirectional bus 31. An engine speed sensor 39 generating an output pulse to express the engine speed is attached to a distributor 38 mounted on the engine 1, and an output of the engine speed sensor 39 is input into the inlet port 36. The air-flow meter 5 generates an output voltage proportional to an amount of suction air, and this output voltage is input into the inlet port 36 through a corresponding AD converter 40. A water temperature sensor 41 generating an output voltage proportional to the engine temperature is attached to the engine 1, and an output voltage of this water temperature sensor 41 is input into the inlet port 36 through the corresponding AD converter 40.

Also, the engine 1 is provided with a starter switch 42 to control the drive of the starter of the engine 1, and a signal expressing that the starter switch 42 has been turned on is inputted into the inlet port 36. Also, there are provided a compressor 44 for air conditioner use driven by the engine 1 through an electromagnetic clutch 43, and an air conditioner switch 45 for operating this compressor 44. A signal expressing that this air conditioner switch 45 has been turned on is input into the inlet port 36. Also, there is provided a battery 46 usually generating an output voltage of 12 (V). The output voltage of this battery 46 is input into the inlet port 36 through the corresponding AD converter 40.

The temperature sensors 17a, 17b attached to the electrically heated type three way catalysts 12a, 12b generate output voltages proportional to the temperatures of the three way catalysts 12a, 12b. These output voltages are input into the inlet port 36 through the corresponding AD converter 40. Further, the first oxygen concentration detectors, that is, the first O₂ sensors 47a, 47b for detecting the oxygen concentration in exhaust gas are disposed in exhaust gas manifolds 8a, 8b in the upstream of the catalytic converters 9a, 9b. Further, the second O₂ sensors 48a, 48b are disposed in exhaust gas pipes 10a, 10b in the downstream of the catalytic converters 9a, 9b. These O₂ sensors 47a, 47b, 48a, 48b generate an output voltage (lean voltage) of about 0.1 V when the air-fuel ratio is lean (thin), and they generate an output voltage (rich voltage) of about 0.9 V when the air-fuel ratio is rich (excessively thick). Output voltages of the $O_2$ sensors 47a, 47b, 48a, 48b are input into the inlet port 36 through the corresponding AD converters 40.

The central electrodes 14a, 14b of the electrically heated type three way catalysts 12a, 12b are respectively connected to the battery 46 through corresponding relays 49a, 49b. The air pump 18 is also connected to the battery 46 through a relay 50. The output port 37 is connected to relays 49a, 49b, 50 through corresponding drive circuits 51. When the relays 49a, 49b are turned on, the electrically heated type three way catalysts 12a, 12b are supplied with electric power, so that the three way catalysts 12a, 12b are heated. When the relay 50 is turned on, the air pump 18 is supplied with electric power, so that the air pump 18 is driven. In this connection, this air pump 18 is provided with a voltage and current detector 51 for detecting a voltage impressed upon an input terminal of the air pump 18, and a current given to the air pump 18. The voltage and current detected by this voltage and current detector 51 are input into the inlet port 36 through the corresponding AD converters 40. The output port 37 is connected to the changeover valve 23 and electromagnetic clutch 43 through the corresponding drive circuits 52, 53.

Next, with reference to FIG. 4, the fundamental operation of the catalyst warming up device of the present invention will be explained as follows.

Figure 4:
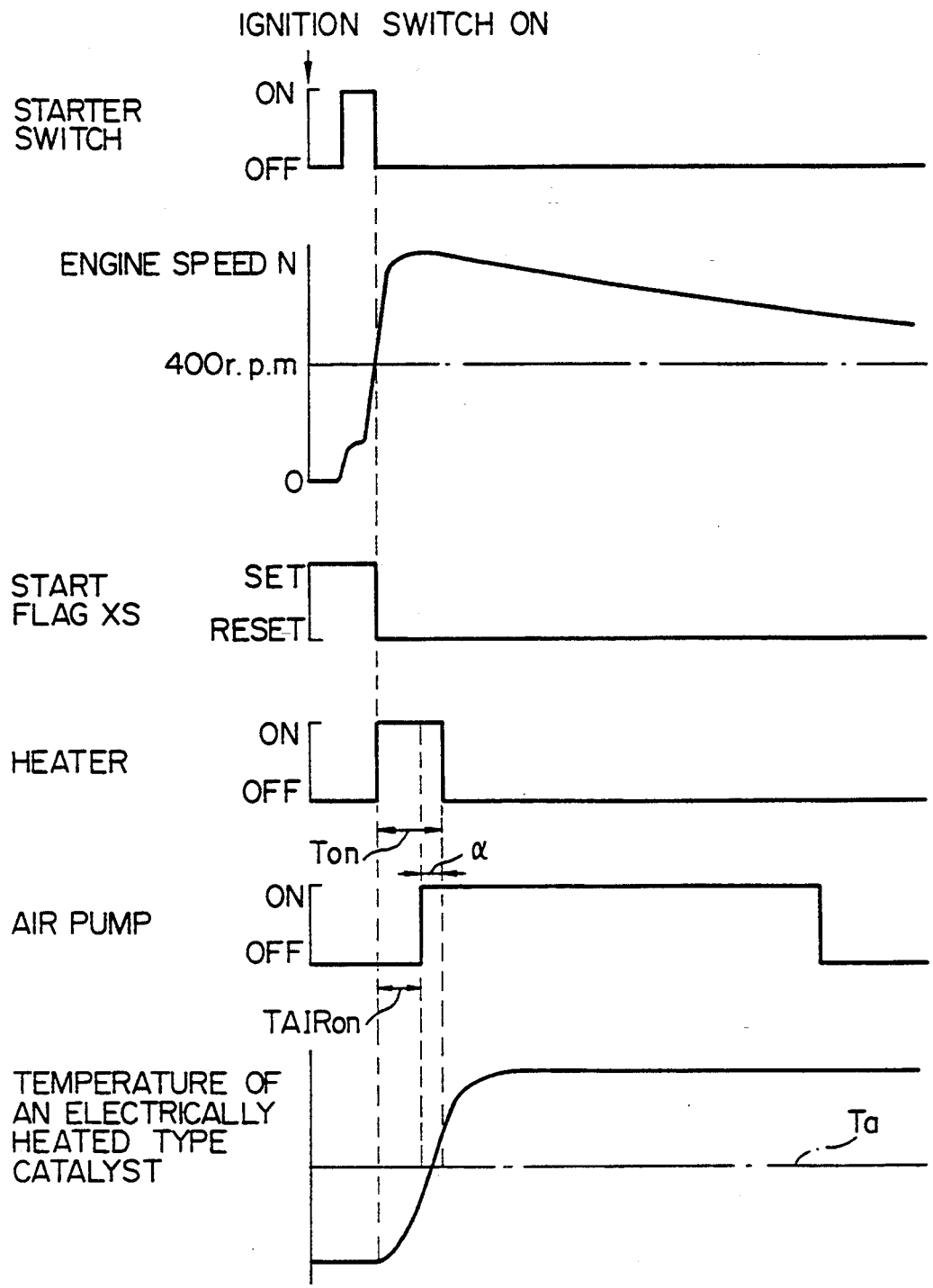
FIG. 4 is a time chart for explaining the operation of the heater and air pump.

As illustrated in FIG. 4, when an ignition switch (not shown in the drawing) is turned on, start flag XS is set. Next, when the starter switch 42 is turned on, the engine starts, and when engine speed N exceeds a predetermined setting value, for example, engine speed N exceeds 400 rpm, start flag XS is reset. When start flag XS is reset, electric power supply to the electrically heated catalysts 12a, 12b is started, that is, the heater composed of the metallic flat sheet 15 and metallic corrugated sheet 16 is turned on. As a result, as shown in FIG. 4, the temperatures of the electrically heated type catalysts 12a, 12b are raised. At this time, rich mixture is being burnt in the cylinder of the engine. Accordingly, exhaust gas containing a large amount of unburnt HC and CO gas is discharged into the exhaust gas manifolds 8a, 8b.

Next, when the temperatures of the electrically heating catalysts 12a, 12b are raised to a value close to activation temperature $T_a$ (shown in FIG. 4) at which the oxidization of unburnt HC and CO gas is facilitated, the air pump 18 is driven, and the supply of secondary air starts so that the air-fuel ratio of exhaust gas can be lean or the same as the theoretical air-fuel ratio, that is, the air-fuel ratio of exhaust gas can be 14.7 to 15.5. Next, when the temperatures of the electrically heated type catalysts 12a, 12b have been raised to activation temperature $T_a$, the oxidization of unburnt HC and CO gas conducted by the secondary air is started. At this time, the temperatures of the electrically heated type catalysts 12a, 12b are quickly raised by the heat of oxidizing reaction. A very large amount of heat is generated by this oxidizing reaction. Accordingly, when the oxidizing reaction is once started, the temperatures of the electrically heated type catalysts 12a, 12b are quickly raised even if the catalysts 12a, 12b are not electrically heated. Therefore, at the start of the oxidization of unburnt HC and CO, the supply of electric power to the electrically heated type catalysts 12a, 12b is stopped as illustrated in FIG. 4. As described above, according to the catalyst warming up method of the present invention, electric power is supplied to the electrically heated type catalysts 12a, 12b until the temperatures of the electrically heated type catalysts 12a, 12b exceed activation temperature Ta a little, and it is not necessary to supply electric power after the temperatures of the electrically heated type catalysts 12a, 12b has exceeded activation temperature Ta. As a result, electric power consumption can be greatly reduced.

As shown in FIG. 4, even after the electric power supply to the electrically heated type catalysts 12a, 12b has been stopped, secondary air is continuously supplied. At this time, the temperature of exhaust gas is raised by the heat generated in the oxidizing reaction, so that the temperatures of the primary three way catalysts 13a, 13b disposed in the downstream of the electrically heated type catalysts 12a, 12b are quickly raised to activation temperature $T_a$, and the oxidization of unburnt HC and CO also starts in the primary three way catalysts 13a, 13b. Then, the supply of secondary air is stopped, and feedback control of the air-fuel ratio is started in accordance with the output signals of the $O_2$ sensors 17a, 17b, 18a, 18b.

When the air-fuel ratio of exhaust gas can be made to be lean or the same as the theoretical air-fuel ratio by supplying secondary air as described above, the purifying operation of unburnt HC and CO is started immediately after the start of the engine. However, for example, in the case where secondary air can not be supplied due to the breakdown of the air pump 18, or in the case where the air-fuel ratio of exhaust gas can not be made to be lean or the same as the theoretical air-fuel ratio even if secondary air is supplied from the air pump 18, a sufficient amount of air to oxidize unburnt HC and CO gas does not exist in the exhaust gas. Therefore, it is no use supplying a current to the electrically heated type catalysts 12a, 12b, because electric power is wasted and no effect can be provided. For this reason, in the case where secondary air cannot be supplied, or in the case where it is not possible to make the air-fuel ratio of exhaust gas to be lean or the same as the theoretical air-fuel ratio, electric power supply to the electrically heated type catalysts 12a, 12b is stopped according to the present invention.

Next, with reference to the flowcharts shown in FIGS. 5 to 9, the first embodiment of catalyst heating control of the present invention will be explained as follows.

Figure 5:
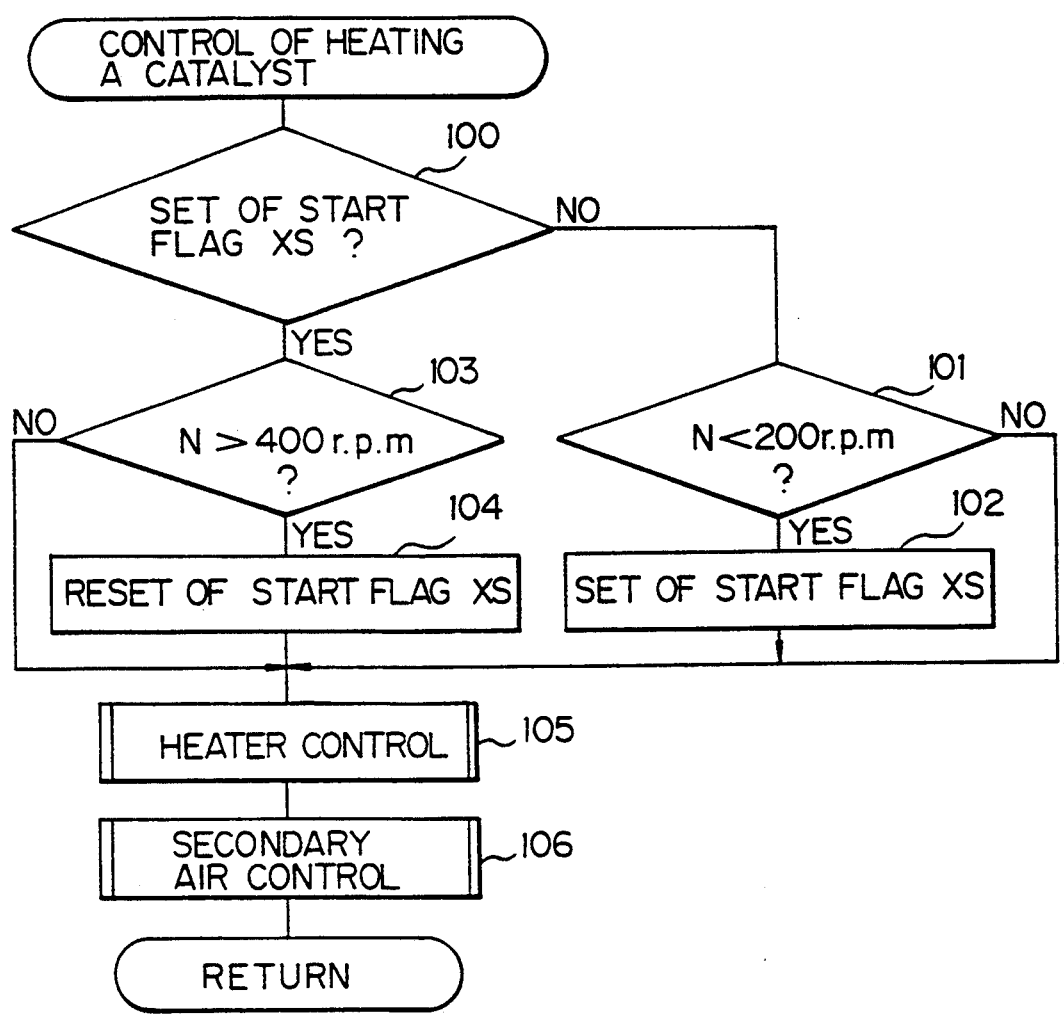
FIGS. 5, 6 and 7 are flowcharts for carrying out heater control.

With reference to FIG. 5, first, in step 100, it is discriminated whether start flag XS shown in FIG. 4 is set or not. Immediately after the ignition switch has been turned on, start flag XS is reset. Therefore, the program advances to step 101, and it is discriminated whether or not engine speed N is lower than a predetermined value, for example, 200 rpm. Since N<200 rpm in this case, the program advances to step 102, and start flag XS is set. That is, as described before, when the ignition switch is turned on, start flag XS is set. Next, the program advances to step 105. When start flag XS is set, the program advances from step 100 to step 103, and it is discriminated whether or not engine speed N has been increased to a value not less than 400 rpm. In the case of N≦400 rpm, the program jumps to step 105. On the other hand, in the case of N>400 rpm, the program advances to step 104, and start flag XS is reset, and then the program advances to step 105.

In step 105, an electric current supplied to the electrically heated type catalysts 12a, 12b is controlled, that is, the heater composed of the metallic flat sheet 15 and metallic corrugated sheet 16 is controlled. Next, in step 106, the supply of secondary air is controlled.

Figure 6:
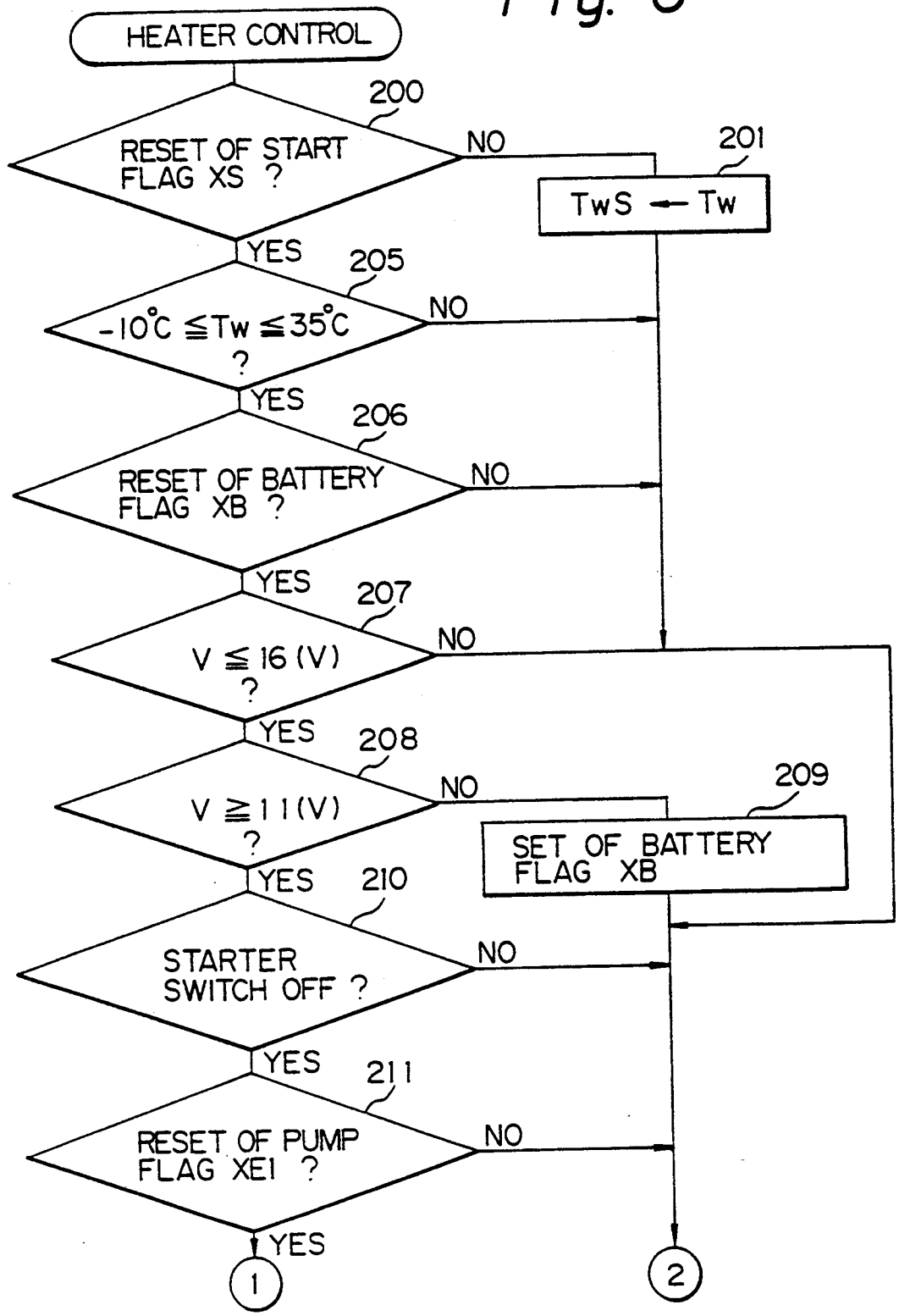
Figure 7:
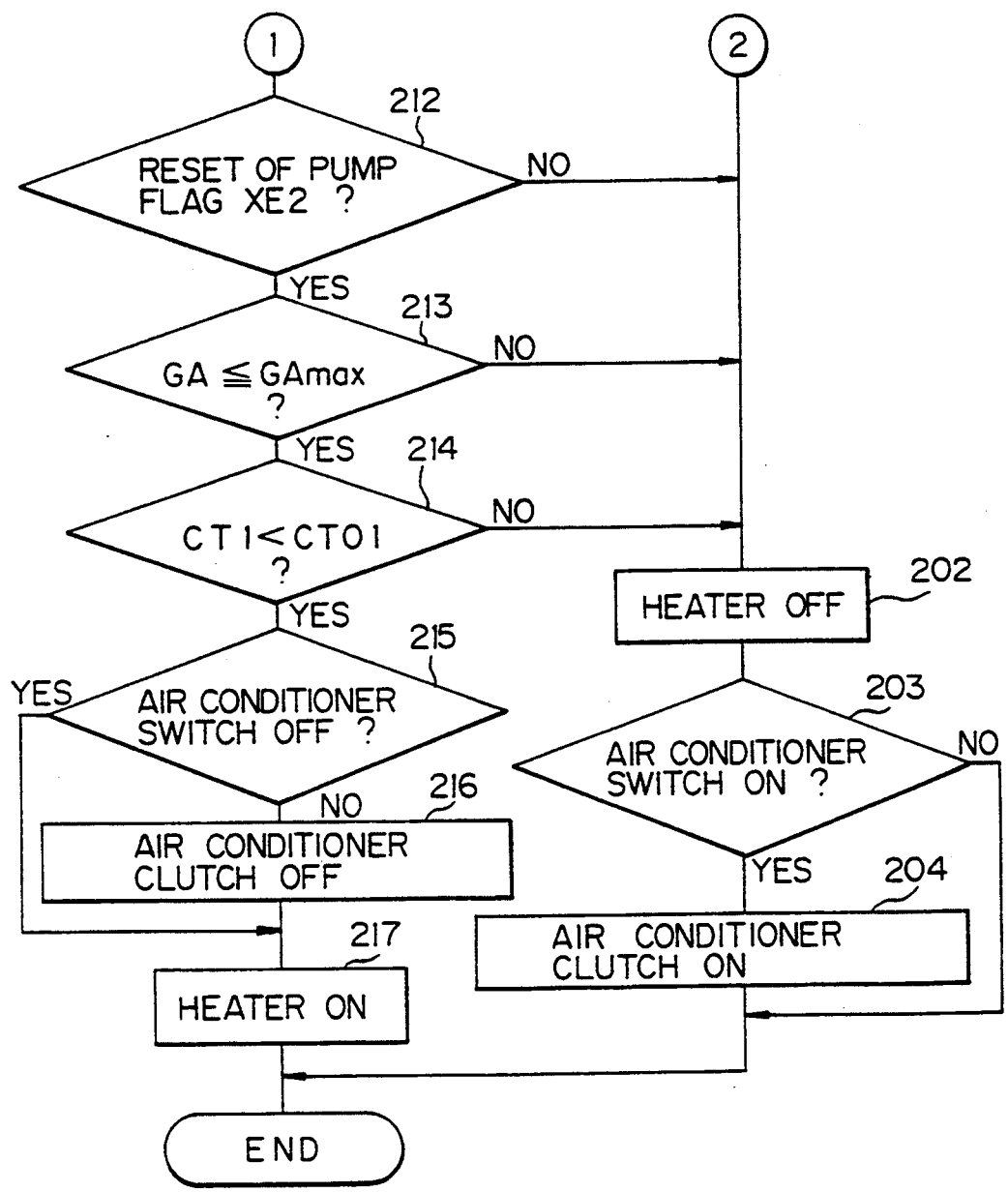

FIGS. 6 and 7 shows the circumstances of heater control conducted in step 105 shown in FIG. 5.

With reference to FIGS. 6 and 7, first, it is discriminated whether or not start flag XS is reset in step 200. When start flag XS is set, that is, until engine speed N is increased to 400 rpm after the start of the engine, the program advances to step 201, and then engine cooling water temperature $T_W$ detected by the cooling water temperature sensor 41 is made to be starting engine cooling water temperature $T_WS$. Next, in step 202, the heater is turned off. That is, electric power supply to the electrically heated type catalysts 12a, 12b is stopped. Next, in step 203, it is discriminated whether or not the air conditioner switch 45 is turned on. In the case where the air conditioner switch 45 is turned on, the program advances to step 204, and the air conditioner clutch 43 is turned on, and then the compressor 44 is driven by the engine 1.

On the other hand, when it is discriminated in step 200 that start flag XS has been reset, that is, when engine speed N has exceeded 400 rpm, the program advances to step 205. Consequently, it can be understood that starting time cooling water temperature $T_wS$ expresses engine cooling water temperature $T_w$ at the time when engine speed N has exceeded 400 rpm. In step 205, it is discriminated whether or not engine cooling water temperature $T_w$ is in the range of $-10°$ C. $\leq T_w \leq 35°$ C. In the case of $T_w < -10°$ C. or $T_w > 35°$ C., the program advances to step 202 and the heater is turned off. On the other hand, in the case of $-10°$ C. $\leq T_w \leq 35°$ C., the program advances to step 206, and it is discriminated whether or not battery flag XB is reset which is set when voltage V of the battery 46 is not more than 11 (v). When battery flag XB is set, the program advances to step 202 and the heater is turned off. On the other hand, when battery flag XB is reset, the program advances to step 207.

In step 207, it is discriminated whether or not the voltage V of battery 46 is not more than 16 (v). In the case of V > 16 (v), the program advances to step 202 and the heater is turned off. On the other hand, in the case of V $\leq$ 16 (v), the program advances to step 208, and it is discriminated whether or not the battery V of 46 voltage is higher than 11 (v). In the case of V < 11 (v), the program advances to step 209 and battery flag XB is set. Next, the program advances to step 202 and the heater is turned off. On the other hand, in the case of V $\geq$ 11 (v), the program advances to step 210, and it is discrimianted whether or not the starter switch 42 is turned off. When the starter switch 42 is turned on, the program advances to step 202 and the heater is turned off. On the other hand, when the starter switch 42 is turned off, the program advances to step 211.

In steps 211 and 212, it is discriminated whether or not pump flag XE1 or XE2 showing the occurrence of a problem of the air pump 18 is reset. These pump flags XE1 and XE2 are processed in a time interruption routine illustrated in FIG. 11. Accordingly, the time interruption routine will be explained here.

Figure 11:
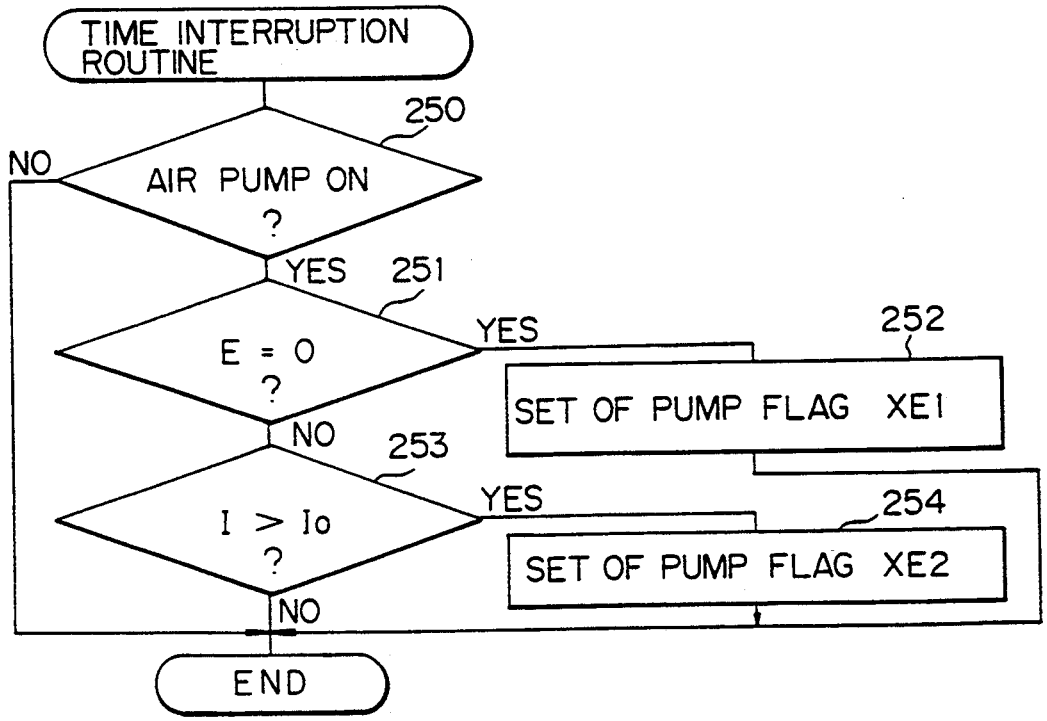

With reference to FIG. 11, first, it is discriminated in step 250 whether or not the relay 50 for operating the air pump 18 is turned on. When the relay 50 is turned off, the processing routine is completed. On the other hand, when the relay 50 is turned on, the program advances to step 251, and it is discriminated in accordance with the output of the voltage and current detector 51 of the air pump 18 whether or not voltage E impressed upon the input terminal of the air pump 18 is zero. For example, when the power supply cable is broken, voltage E becomes zero. When voltage E is zero, the air pump 18 is not driven. In this case, the program advances to step 252, and pump flag XE1 is set.

On the other hand, when E is not zero, the program advances from step 251 to step 253, and it is discriminated in accordance with the output of the voltage and current detector 51 of the air pump 18 whether or not current I supplied to the air pump 18 exceeds allowable current $I_0$. For example, when the air pump 18 is seized and it cannot be rotated, an excessive amount of current flows in the air pump 18. In this case, current I is increased larger than allowable current $I_0$. In the case of $I > I_0$, secondary air is not discharged from the air pump 18 at all or even when secondary air is discharged from the air pump 18, the amount of discharged air is not sufficient. In this case, the program advances to step 254, and pump glag EX2 is set. The circumstances of set and reset of pump flags EX1 and EX2 are stored in the backup RAM 35.

With reference to FIGS. 6 and 7, when it is judged in step 211 that pump flag XE1 is set, the program advances to step 202, and the heater is turned off. On the other hand, when it is judged in step 211 that pump flag XE1 is reset, the program advances to step 212. When it is judged in step 212 that pump flag XE2 is set, the program advances to step 202, and the heater is turned off, and when the pump flag XE2 is reset, the program advances to step 213.

It is discriminated in step 213 whether or not an amount of accumulated suction air GA accumulated after the start of the engine is smaller than a predetermined maximum amount of air $GA_{max}$. This amount of accumulated suction air GA is computed by the time interruption routine shown in FIG. 10. Consequently, the time interruption routine shown in FIG. 10 will be explained here.

Figure 10:
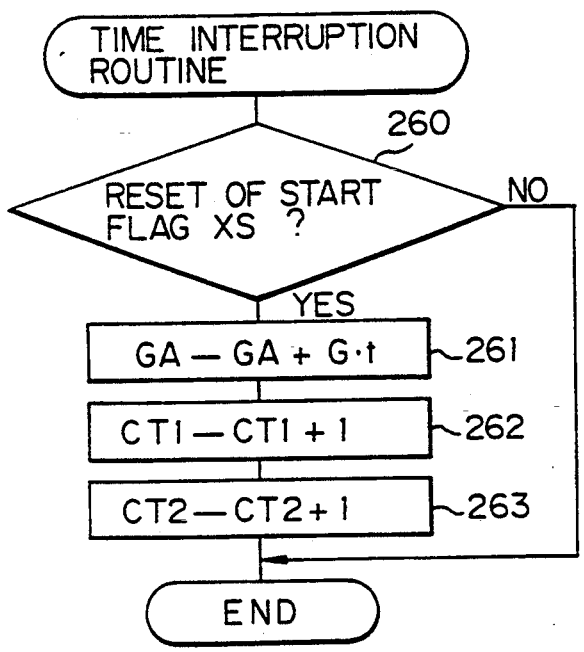
FIGS. 10 and 11 are flowcharts for showing a time interruption routine.

First, referring to FIG. 10, it is discriminated in step 260 whether or not start flag XS is reset. In the case where start flag XS is reset, the product G.t of suction air amount G measured by the air flow meter 5 and interruption time interval t, is added to GA, so that accumulated suction air amount GA can be computed. Suction air amount G measured by the air flow meter 5 expresses an amount of suction air supplied to the engine cylinder per unit time. Therefore, the product G.t expresses an amount of suction air supplied to the engine cylinder in the interruption time interval. Consequently, accumulated suction air amount GA expresses an accumulated amount of suction air supplied to the engine cylinder after engine speed N exceeded 400 rpm.

Next, in step 262, count value CT1 is increased by 1, and in step 263, count value CT2 is increased by 1. That is, when engine speed N has exceeded 400 rpm, count values CT1 and CT2 are counted up.

On the other hand, maximum suction air amount $GA_{max}$ is determined to stop the supply of current to the heater. That is, when accumulated suction air amount GA is increased to a value of maximum suction air amount $GA_{max}$, the supply of current to the heater is stopped. That is, the electrically heated type catalysts 12a, 12b are heated not only by the heater but also by the exhaust gas. Accordingly, until the temperatures of the electrically heated type catalysts 12a, 12b are raised to the activation temperature, the electrically heated type catalysts 12a, 12b are affected by the accumulated amount of exhaust gas which has flown into the electrically heated type catalysts 12a, 12b after the start of the engine. Accordingly, in the embodiment of the present invention, an accumulated amount of exhaust gas which has flown until the temperatures of the electrically heated type catalysts 12a, 12b exceed the activation temperature a little, is previously found, that is, accumulated suction air amount GA is previously found as maximum suction air amount $GA_{max}$, and when accumulated suction air amount GA has increased to a value of maximum suction air amount $GA_{max}$, the supply of current to the heater is stopped.

In this connection, the higher the starting time cooling water temperature $T_wS$ is, the quicker the temperatures of the electrically heated type catalysts 12a, 12b are raised. Accordingly, as illustrated in FIG. 12, the higher the starting time cooling water temperature $T_wS$ is, the smaller the maximum suction air amount $GA_{max}$ is decreased. Also, the higher the voltage V of the battery 46 is, the more heat is generated by the heater. Accordingly, the temperatures of the electrically heated type catalysts 12a, 12b are raised quickly. Therefore, as illustrated in FIG. 12, the higher the voltage V of the battery 46 is, the smaller the maximum suction air amount $GA_{max}$ is decreased. In this connection, this maximum suction air amount $GA_{max}$ is a function of starting time cooling water temperature $T_wS$ and voltage V of the battery 46, and previously stored in the ROM 32 in the form of a map illustrated in FIG. 13(A).

Referring to FIGS. 6 and 7 again, when it is discriminated in step 213 that $GA \leq GA_{max}$, the program advances to step 214. It is discriminated in step 214 whether or not count value CT1 computed by the routine shown in FIG. 10 is smaller than a predetermined value CT01, for example, corresponding to 10 seconds. This CT01 is provided for the purpose of safety so that the heater cannot be turned on over a long period of time. In the case of $CT1 \geq CT01$, the program advances to step 202 so as to turn off the heater. On the other hand, in the case of $CT1 < CT01$, the program advances to step 215. In step 215, it is discriminated whether the air conditioner switch 45 is turned off or not, and when the air conditioner switch 45 is turned off, the program advances to step 217. On the other hand, when the air conditioner switch 45 is turned on, the program advances to step 216, and the air conditioner switch 43 is turned off. That is, the operation of the compressor 44 is stopped. Next, the program advances to step 217 and the heater is turned on, so that the heating operation of the electrically heated type catalysts 12a, 12b is started.

Accordingly, the heater is turned on when the following conditions are satisfied: When engine speed N exceeds 400 rpm, temperature $T_w$ satisfies the inequality of $-10°$ C. $\leq Tw \leq 35°$ C., and also voltage V satisfies the inequality of 11 (v) $< V <$ 16 (v). Further, the starter switch 42 is turned on, and both pump flags XE1 and XE2 are reset. Next, in the case of $GA > GA_{max}$ in step 213, the supply of current to the heater is stopped.

In this connection, when the air pump 18 is out of order and at least one of the pump flags XE1 and XE2 is set, the heater is turned off. Consequently, it can be understood that the heater is not turned on unless a sufficient amount of secondary air is supplied by the air pump 18.

Figure 8:
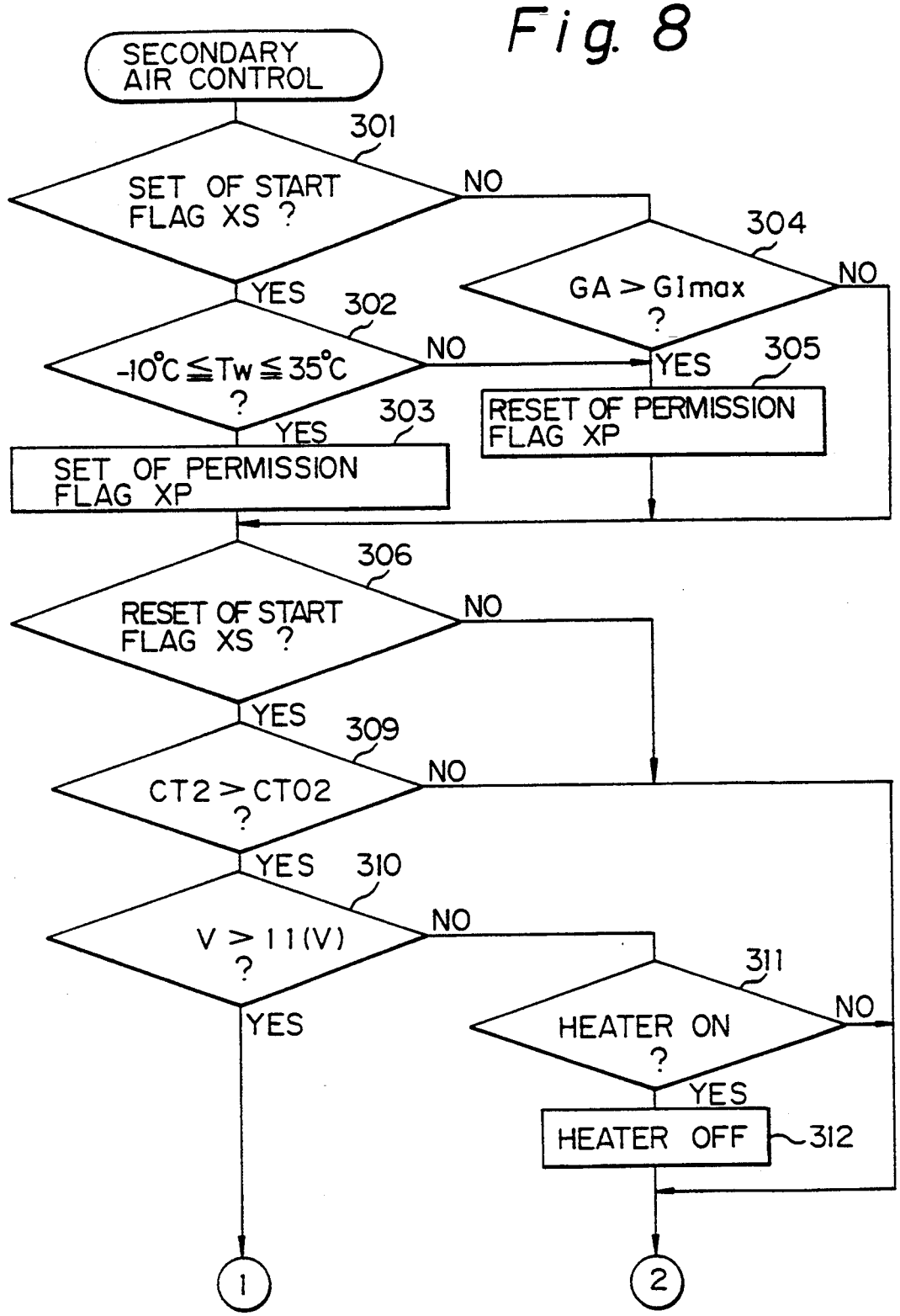
FIGS. 8 and 9 are flowcharts for carrying out secondary air control.
Figure 9:
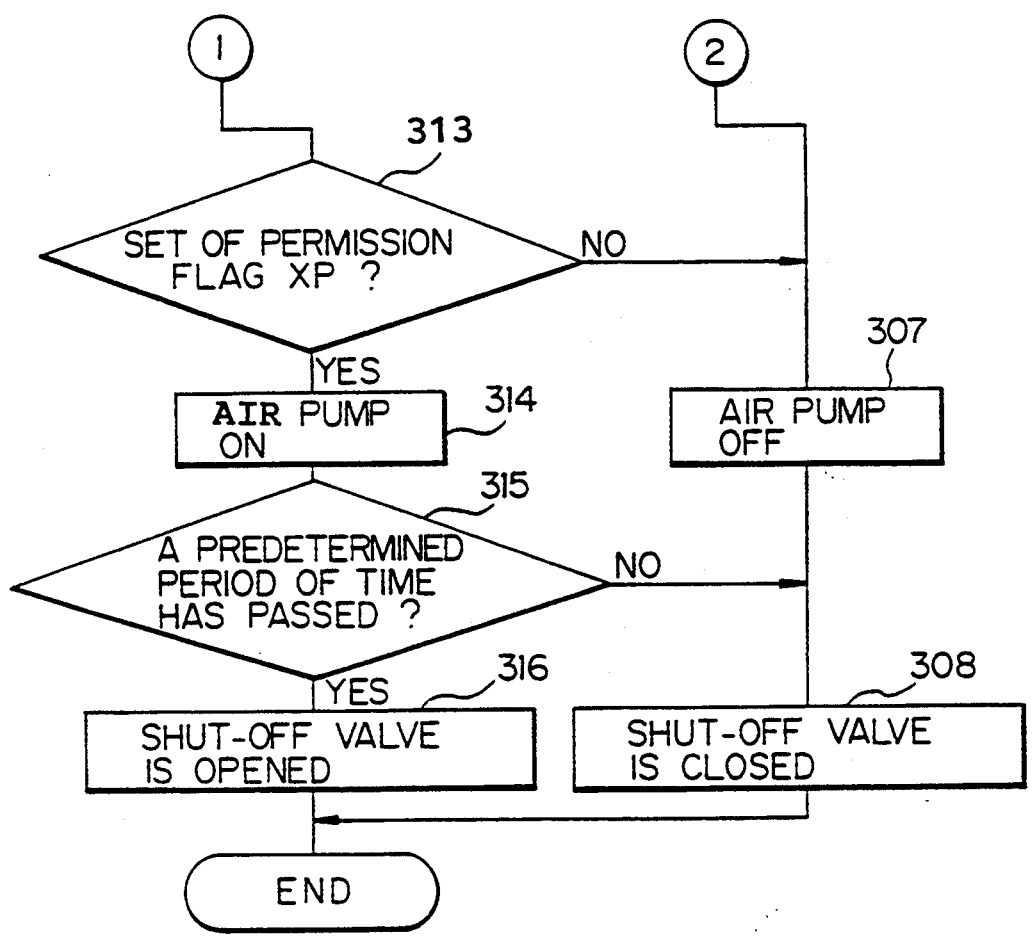

FIGS. 8 and 9 show the secondary air supply control conducted in step 106 shown in FIG. 5.

Referring to FIGS. 8 and 9, first, it is discriminated in step 301 whether start flag XS is set or not. When start flag XS is set, that is, when engine speed N has not increased to 400 rpm, the program advances to step 302, and it is discriminated in step 302 whether or not engine cooling water temperature $T_w$ is in the range of $-10°$ C. $\leq T_w \leq 35°$ C. In the case of $-10°$ C. $\leq T_w \leq 35°$ C., the program advances to step 303, and permission flag XP showing that the conditions for supplying secondary air are satisfied is set, and then the program advances to step 306. On the other hand, in the case of $T_w < -10°$ C. or $T_w < 35°$ C., the program advances to step 305 and permission flag is reset, and then the program advances to step 306.

It is discriminated in step 306 whether or not start flag XS is reset. Since start flag XS is set at this time, the program advances to step 307 and the air pump 18 is turned off. Next, in step 308, the shut-off valve 19 is closed by the action of the changeover valve 23.

On the other hand, when start flag XS is reset, that is, engine speed N exceeds 400 rpm, the program advances from step 301 to step 304, and it is discriminated whether or not accumulated suction air amount GA has increased to a value higher than maximum suction air amount $GI_{max}$. This maximum suction air amount $GI_{max}$ is determined to stop the supply of secondary air. That is, when accumulated suction air amount GA has increased to a value of maximum suction air amount $GI_{max}$, the supply of secondary air is stopped. As can be seen from FIG. 12, this maximum suction air amount $GI_{max}$ is much larger than maximum suction air amount $GA_{max}$ for stopping the supply of current to the heater. Therefore, it can be understood that the supply of secondary air is stopped in a short time after the heater was turned off. As can be seen from FIG. 12, maximum suction air amount $GI_{max}$ is also a function of starting time cooling water temperature $T_wS$ and voltage V of the battery 46. This maximum suction air amount $GI_{max}$ is previously stored in the ROM 32 in the form of a map shown in FIG. 13(B).

When it is judged in step 304 that $GA \leq GI_{max}$, the program jumps to step 306. At this time, it is judged in step 306 that start flag XS is reset. Therefore, the program advances to step 309. It is discriminated in step 309 whether or not count value CT2 computed in the routine shown in FIG. 10 has exceeded predetermined value CTO2. This predetermined value CTO2 expresses a period of time from when engine speed N exceeded 400 rpm to when the supply of secondary air has started. For example, this predetermined value CTO2 is determined to be a value corresponding to 5 seconds. When it is judged in step 309 that $CT2 \leq CTO2$, the program advances to step 307, and when $CT2 > CTO2$, that is, when 5 seconds have passed after engine speed N exceeded 400 rpm, the program advances to step 310.

It is discriminated in step 310 whether or not voltage V of the battery 46 is higher than 11 (v). When $V \leq 11$ (v), the program advances to step 311, and it is discriminated whether or not the heater is turned on. When the heater is turned off, the program advances to step 307, and the air pump 18 is turned off. On the other hand, when it has been discriminated that the heater is turned on, the program advances to step 312 and the heater is turned off. Next, the program advances to step 307 and the air pump 18 is turned off. Voltage V of the battery 46 is normally 12 (v). However, when voltage V of the battery 46 is decreased to a value not more than 11 (v), a sufficient amount of secondary air cannot be supplied even when the air pump 18 is driven. Consequently, both the air pump 18 and the heater are turned off at this time.

On the other hand, when it has been discriminated in step 310 that V>11 (v), the program advances to step 313, and it is discriminated whether or not permission flag XP is set. When permission flag XP is set, the program advances to step 314 and the air pump 18 is turned on. Next, the program advances to step 315, and it is discriminated whether or not a predetermined period of time, for example, 0.5 second has passed after the air pump 18 was turned on. In the case where the predetermined period of time has not passed, the program advances to step 308, and the shut-off valve 19 continues to be in a closed condition. In the case where the predetermined period of time has passed, the program advances to step 316, and the shut-off valve 19 is opened by the switching action of the changeover valve 23. That is, after the air pump 18 was turned on, the program waits for an increase of discharging pressure of the air pump 18. After the discharging pressure of the air pump 18 has been increased, the shut-off valve 19 is opened, and the supply of secondary air starts.

Next, when it has been discriminated in step 304 that $GA > GI_{max}$, the program advances to step 305, and permission flag XP is reset. After permission flag XP has been reset, the program advances from step 313 to step 307 so that the air pump 18 is turned off. Next, in step 308, the shut-off valve 19 is closed. Therefore, the supply of secondary air is stopped.

Next, referring to the flowcharts shown in FIGS. 14 to 18, the second embodiment of catalyst heating control of the present invention will be explained as follows.

Figure 14:
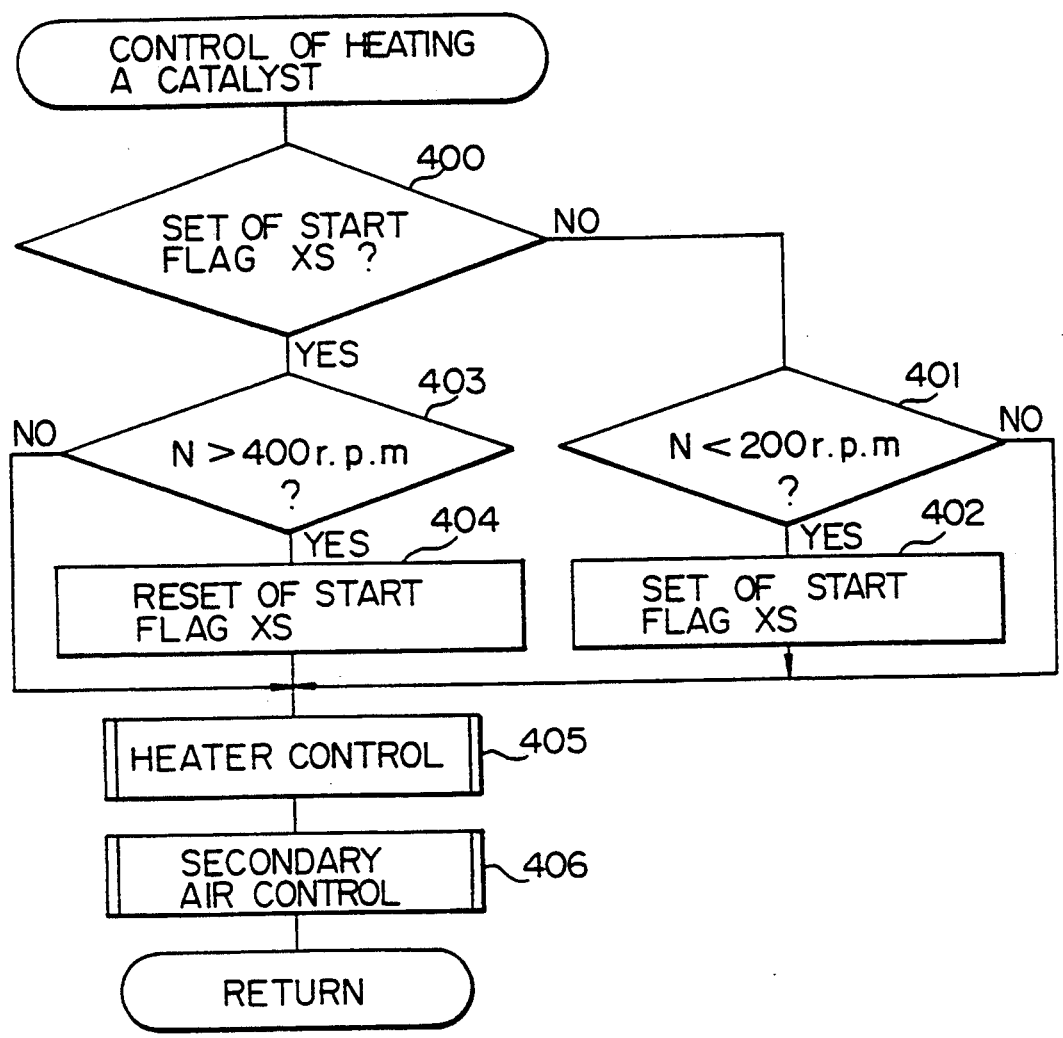
FIGS. 14, 15 and 16 are flowcharts showing another embodiment for carrying out heating control of the catalyst.

First, with reference to FIG. 14, it is discriminated in step 400 whether or not start flag XS shown in FIG. 14 is set. Since start flag XS is reset immediately after the ignition switch has been turned on, the program advances to step 401, and it is discriminated whether or not engine speed N is lower than a predetermined value, for example, 200 rpm. Since N<200 rpm at this time, the program advances to step 402, and start flag XS is set. That is, as described before, when the ignition switch is turned on, start flag XS is set. Then, the program advances to step 405. When the start flag XS is set, the program advances from step 400 to step 403, and it is discriminated whether or not engine speed N has increased to a value not less than 400 rpm. In the case of N≦400 rpm, the program jumps to step 405. On the other hand, in the case of N>400 rpm, the program advances to step 404, and start flag XS is reset, and then the program advances to step 405.

In step 405, the control of current supply is conducted on the electrically heated type catalysts 12a, 12b, that is, the heater composed of the metallic flat sheet 15 and metallic corrugated sheet 16 is controlled. Next, in step 406, the supply of secondary air is controlled.

Figure 15:
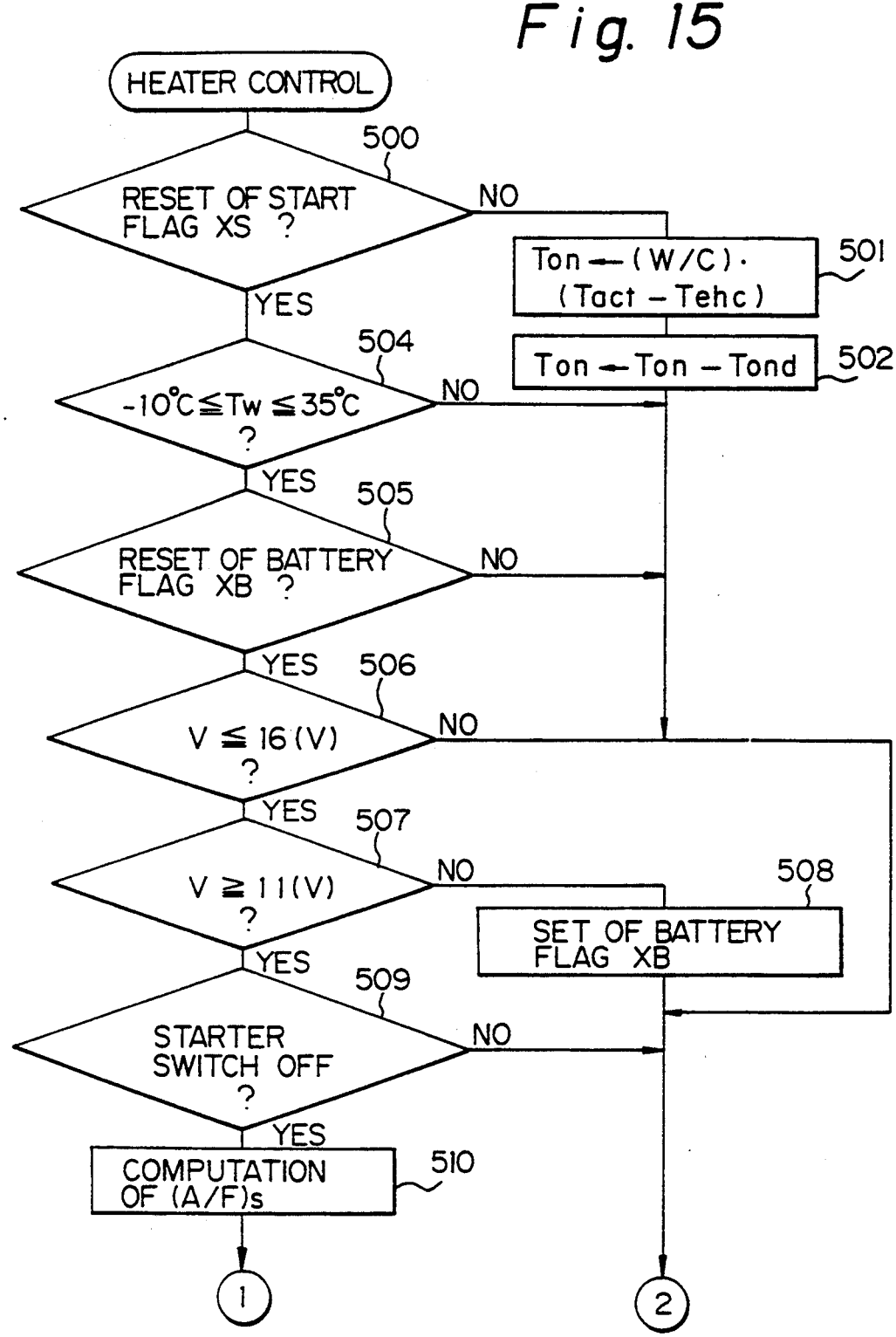
Figure 16:
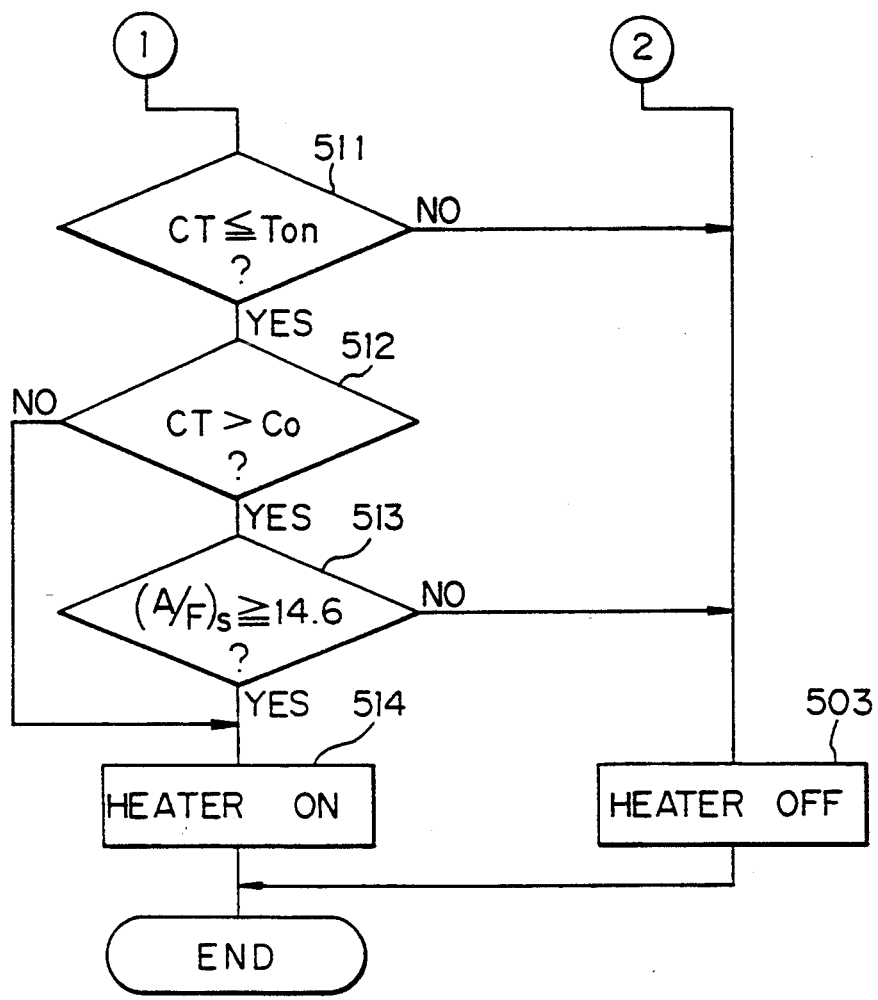

FIGS. 15 and 16 show the operation of heater control conducted in step 405.

Figure 19A:
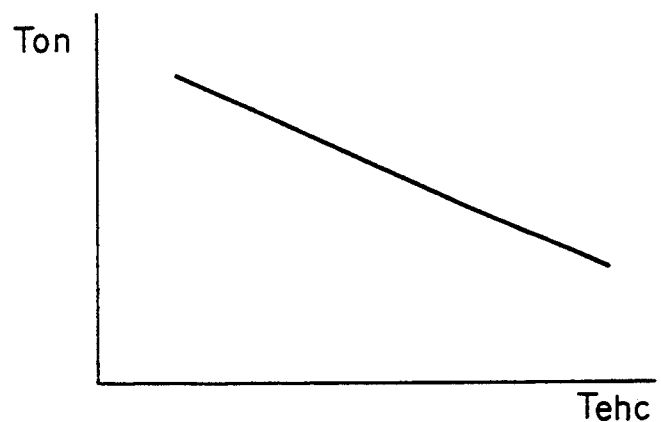
FIGS. 19(A) and 19(B) are diagrams showing energizing time $T_{on}$ of the heater, and others.

Referring to FIGS. 15 and 16, first, it is discriminated in step 500 whether or not start flag XS is reset. When start flag XS is set, that is, until engine speed N is increased to 400 rpm after the start of the engine, the program advances to step 501, and energizing time $T_{on}$ of the heater is computed in accordance with the following expression.

$$T_{on} = (W/C) \cdot (T_{act} - T_{ehc})$$

where
W: electric power consumption of the heater
C: heat capacity of the heater
$T_{act}$: temperature previously set on the heater
$T_{ehc}$: actual temperature of the heater detected by the temperature sensors 17a, 17b As can be seen from the above expression, the smaller the temperature difference ($T_{act} - T_{ehc}$) between setting temperature $T_{act}$ and actual temperature $T_{ehc}$ of the heater is, the more the energizing time $T_{on}$ is shortened. In the above expression, heat capacity C and setting temperature $T_{act}$ are fixed values. Since the resistance of the heater seldom varies with respect to the change in temperature, power consumption W is determined by voltage V of the battery 46. Consequently, as illustrated in FIG. 19(A), energizing time $T_{on}$ is approximately a function of heater temperature $T_{ehc}$.

Next, in step 502, final energizing time $T_{on}$ of the heater is computed in accordance with the following expression.

$$T_{on} = (T_{on} - T_{ond})$$

Figure 19B:
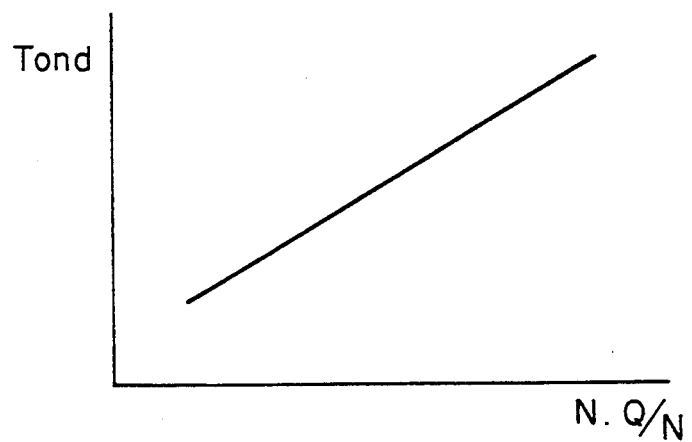

In this expression, $T_{ond}$ expresses a compensated value of the energizing time according to the exhaust gas heat. That is, since the heater is also heated by the exhaust gas heat, the energizing time can be shortened when an amount of exhaust gas heat is large. Accordingly, the larger the amount of exhaust gas heat is, the higher the value of $T_{ond}$ is increased, so that the final energizing time $T_{on}$ is reduced. In this connection, the higher the engine load (suction air amount Q/engine speed N) Q/N, the larger the amount of heat of exhaust gas. Also, the higher the engine speed N, the larger the amount of heat of exhaust gas. Accordingly, as shown in FIG. 19(B), compensated value $T_{ond}$ of the energizing time according to the heat of exhaust gas is increased high as the value of N.Q/N is increased. In this case, a relation shown in FIG. 19(B) is previously stored in the ROM 32. When final energizing time $T_{on}$ is computed in step 502, the program advances to step 503 and the heater is turned off.

On the other hand, when it is discriminated in step 500 that start flag XS has been reset, that is, when engine speed N exceeds 400 rpm, the program advances to step 504, and it is discriminated whether or not engine cooling water temperature $T_w$ is in the range of $-10°$ C.$\leq T_w \leq 35°$ C. In the case of $T_w < -10°$ C. or $T_w > 35°$ C., the program advances to step 503, and the heater is turned off. On the other hand, in the case of $-10°$ C.$\leq T_w \leq 35°$ C., the program advances to step 505, and it is discriminated whether or not battery flag XB is reset, wherein battery flag XB is set when voltage V of the battery 46 is decreased to a value not more than 11 (v). When battery flag XB is set, the program advances to step 503 and the heater is turned off. On the other hand, when battery flag XB is reset, the program advances to step 506.

In step 506, it is discriminated whether or not voltage V of the battery 46 is not more than 16 (v). In the case of V>16 (v), the program advances to step 503 and the heater is turned off. On the other hand, in the case of V≦16 (v), the program advances to step 507 and it is discriminated whether or not voltage V of the battery 46 is higher than 11 (v). In the case of V<11 (v), the program advances to step 508 and battery flag XB is set. Next, the program advances to step 503 and the heater is turned off. On the other hand, in the case of V≧11 (v), the program advances to step 509, and it is discriminated whether or not the starter switch 42 is turned off. When the starter switch 42 is turned on, the program advances to step 503 and the heater is turned off. On the other hand, when the starter switch 42 is turned off, the program advances to step 510.

In step 510, estimated value $(A/F)_s$ of the air-fuel ratio of exhaust gas flowing into the electrically heated type catalysts 12a, 12b when secondary air is supplied, is estimated according to the following expression.

$$(A/F)_s = K \cdot (G + W_a)/(TAU \cdot N)$$

where
G: amount of suction air supplied to the engine cylinder per unit time, the amount of suction air being measured by the air flow meter 5
Wa: amount of secondary air discharged from the air pump 18 per unit time
TAU: amount of fuel injection for each fuel injecting operation
N: engine speed
K: proportional constant Since the sum of amounts of air supplied per unit time is expressed by $(G+W_a)$ and the amount of fuel supplied per unit time is expressed by $TAU \cdot N$, estimated value $(A/F)_s$ of the air-fuel ratio of exhaust gas can be expressed by the above expression.

Figure 20A:
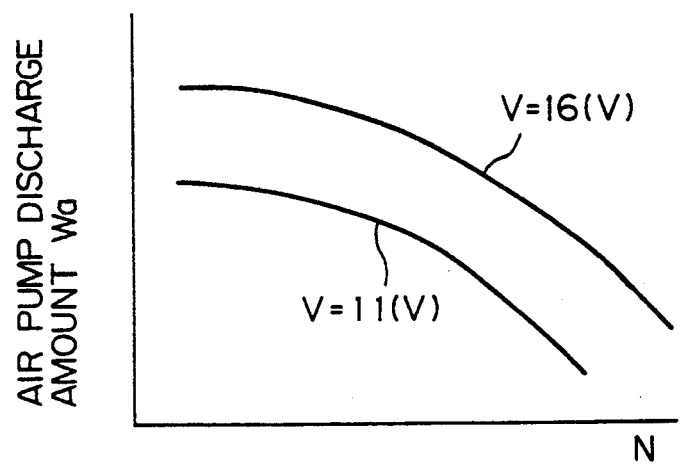
FIGS. 20(A) and 20(B) are diagrams showing an amount of secondary air discharged from the air pump.
Figure 20B:
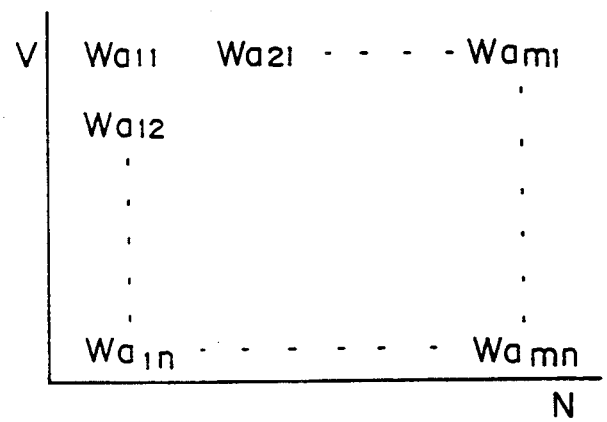

Since the exhaust gas pressure is raised as engine speed N is increased, the higher the engine speed N is increased, the smaller the secondary air amount $W_a$ discharged from the air pump 18 is decreased as illustrated in FIG. 20(A), and the higher the voltage V of the battery 46 is raised, the larger the secondary air amount $W_a$ discharged from the air pump 18 is increased. Accordingly, amount $W_a$ of secondary air supplied from the air pump 18 into the exhaust manifolds 8a, 8b is a function of engine speed N and voltage V of the battery 46 as illustrated in FIG. 20(A). This secondary air amount $W_a$ is previously stored in the ROM 32 in the form of a map shown in FIG. 20(B). In this case, fuel injection time TAU is computed by another routine not shown in the drawing.

After estimated value $(A/F)_s$ of the air-fuel ratio of exhaust gas has been computed in step 510, the program advances to step 511, and it is discriminated whether or not count value CT is lower than energizing time $T_{on}$. This count value CT is computed by the time interruption routine shown in FIG. 21. Accordingly, the time interruption routine shown in FIG. 21 will be explained here.

Figure 21:
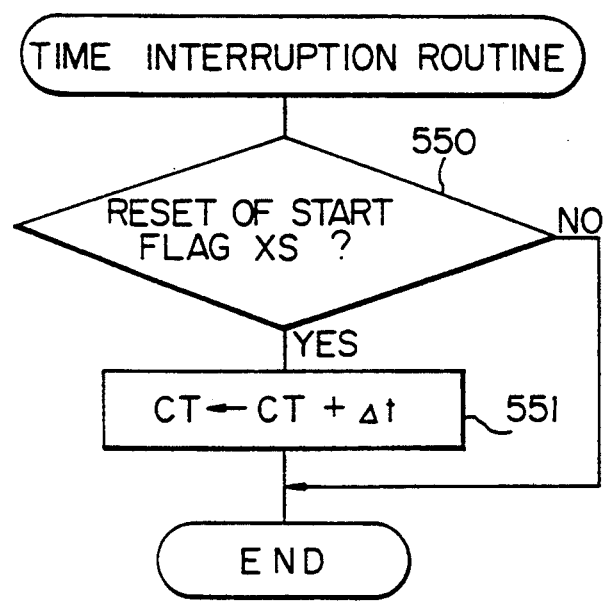
FIG. 21 is a flowchart showing a time interruption routine.

With reference to FIG. 21, first, it is discriminated in step 550 whether start flag XS is reset or not. When start flag XS is reset, the program advances to step 551, and time interruption interval Δt is added to count value CT. Accordingly, count value CT expresses a period of time that has passed after engine speed N exceeded 400 rpm.

When it is discriminated in step 511 that $CT \leq T_{on}$, the program advances to step 512, and it is discriminated whether or not the count value CT, that is, the lapsed time has exceeded a predetermined value $C_o$, for example, 1 second. In the case of $CT > C_o$, the program advances to step 514 and the heater is turned on. On the other hand, in the case of $CT > C_o$, the program advances to step 513, and it is discriminated whether or not estimated value $(A/F)_s$ of the air-fuel ratio of exhaust gas is higher than 14.6, that is, the theroetical air-fuel ratio. In the case of $(A/F)_s < 14.6$, that is, in the case where estimated value $(A/F)_s$ of the air-fuel ratio of exhaust gas is rich, the program advances to step 503 and the heater is turned off. In the case of $(A/F)_s < 14.6$, that is, in the case where estimated value $(A/F)_s$ of the air-fuel ratio of exhaust gas is lean, or the same as the theoretical air-fuel ratio, the program advances to step 514 and the heater is continuously turned on.

As described above, in the second embodiment, in the case where the air-fuel ratio of exhaust gas cannot be made to be lean or the same as the theoretical air-fuel ratio even if the air pump 18 is normally operated, the heater is turned off. In this connection, in this embodiment, after the program has waited for the next operation for a predetermined period of time, it is discriminated whether or not $(A/F)_s \geq 14.6$. The reason why the program has waited is to stabilize the output voltage of the air flow meter 5. When it is judged that $CT > T_{on}$ in step 511 after the heater has been turned on, the program advances to step 503, and the heater is turned off.

Figure 17:
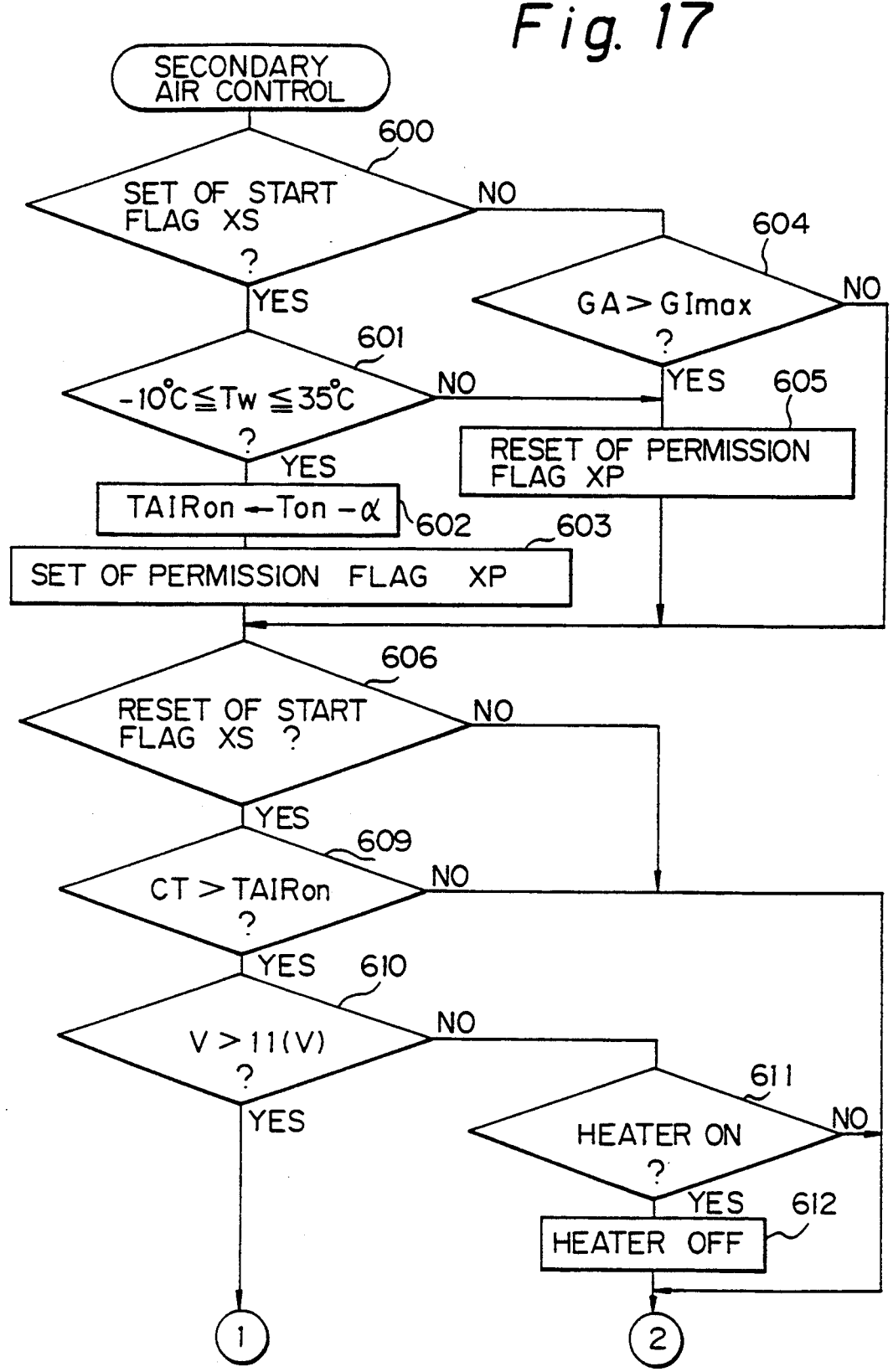
FIGS. 17 and 18 are flowcharts showing another embodiment for carrying out secondary air control.
Figure 18:
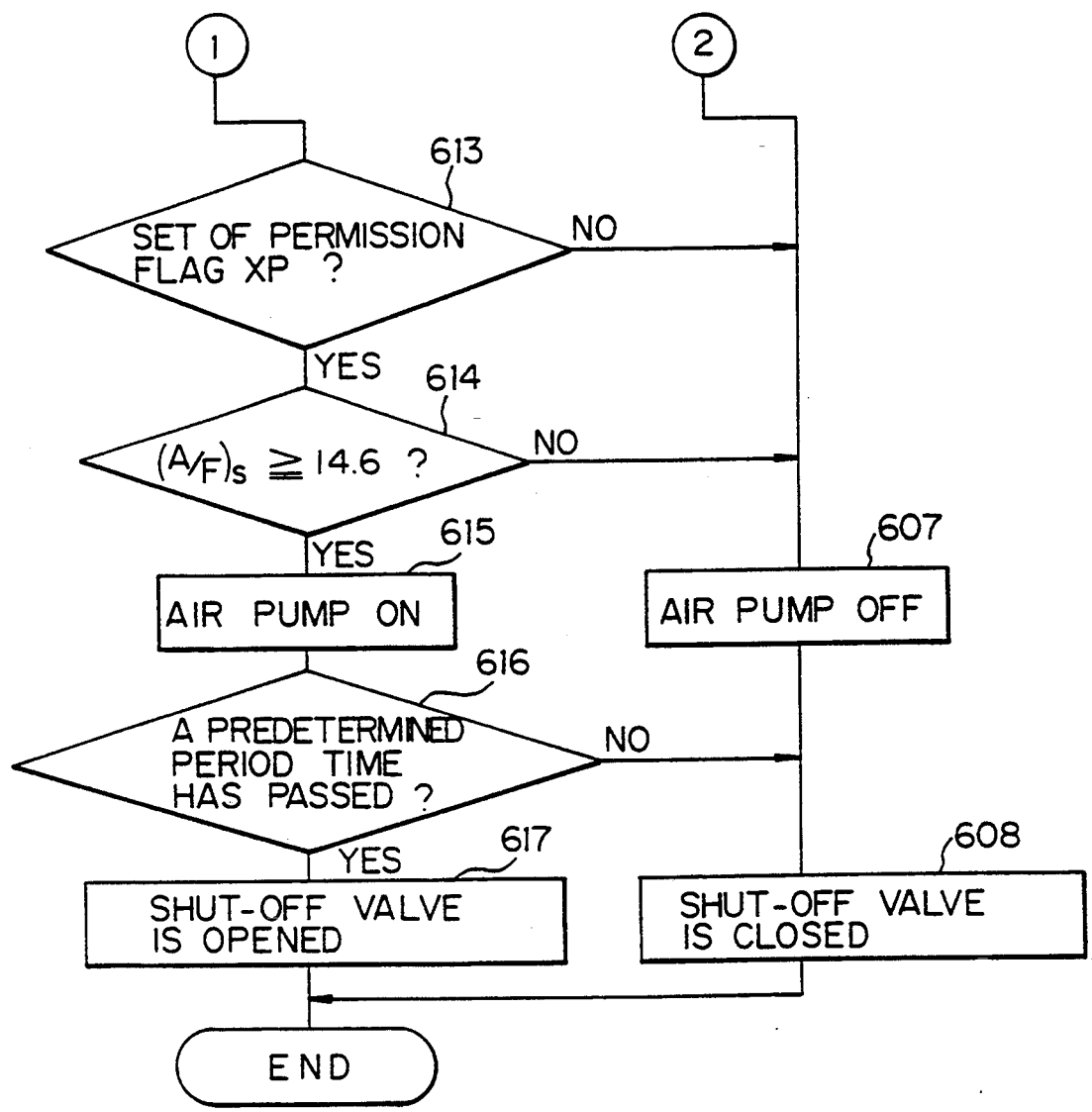

FIGS. 17 and 18 show the operation of secondary air supply control conducted in step 406 in FIG. 14.

Referring to FIGS. 17 and 18, first, it is discriminated in step 600 whether or not start flag XS is set. When start flag XS is set, that is, when engine speed N has not increased to 400 rpm, the program advances to step 601, and it is discriminated whether or not engine cooling water temperature $T_w$ is in the range of $-10°$ C. $\leq T_w \leq 35°$ C. In the case of $-10°$ C. $\leq T_w \leq 35°$ C., the program advances to step 602, and time $TAIR_{on}$ from when the heater is turned on, to when the supply of secondary air is started, is computed according to the following expression.

$$TAIR_{on} \leftarrow T_{on} - \alpha$$

In the above expression, as described above, $T_{on}$ expresses the energizing time of the heater, and α is determined so that the supply of secondary air is started immediately before the temperatures of the electrically heated type catalysts 12a, 12b are raised to activation temperature $T_a$, as shown in FIG. 4.

When $TAIR_{on}$ is computed in step 602, the program advances to step 603, and permission flag XP is set which shows that the conditions to supply secondary air are satisfied, and then the program advances to step 606. On the other hand, when it is judged in step 601 that $T_w < -10°$ C. or $T_w > 35°$ C., the program advances to step 605 and the permission flag is reset, and then the program advances to step 606.

In step 606, it is discriminated whether or not start flag XS is reset. Since start flag XS is set at this time, the program advances to step 607 and the air pump 18 is turned off. Next, in step 608, the shut-off valve 19 is closed by the switching action of the changeover valve 23.

On the other hand, when start flag XS is reset, that is, engine speed N exceeds 400 rpm, the program advances from step 600 to step 604, and it is discriminated whether or not accumulated suction air amount GA becomes larger than maximum suction air amount $GI_{max}$ shown in FIG. 12. In the case of $GA \leq GI_{max}$, the program jumps to step 606. At this time, it is judged in step 606 that start flag XS is reset. Therefore, the program advances to step 609. It is discriminated in step 609 whether or not count value CT computed in the routine shown in FIG. 21 exceeds $TAIR_{on}$. As described before, this $TAIR_{on}$ expresses a period of time from when the heater is turned on, to the start of supply of secondary air. When it is judged in step 609 that $CT \leq TAIR_{on}$, the program advances to step 607, and when $CT > TAIR_{on}$, the program advances to step 610.

In step 610, it is discriminated whether or not voltage V of the battery 46 is higher than 11 (v). When $V \leq 11$ (v), the program advances to step 611, and it is discriminated whether or not the heater is turned on. When the heater is turned off, the program advances to step 607, and the air pump 18 is turned off. On the other hand, when it is discriminated that the heater is turned on, the program advances to step 612 and the heater is turned off, and then the program advances to step 607 and the air pump 18 is turned off. That is, when voltage V of the battery 46 is not more than 11 (v), a sufficient amount of secondary air cannot be supplied even if the air pump 18 is driven. Accordingly, the air pump 18 is turned off and also the heater is turned off in this case.

On the other hand, when it has been discriminated in step 610 that $V > 11$ (v), the program advances to step 613 and it is discriminated whether or not permission flag XP is set. When permission flag XP is set, the program advances to step 614, and it is discriminated whether or not estimated value (A/F)s of the air-fuel ratio of exhaust gas is higher than the theoretical air-fuel ratio. In the case of $(A/F)_s < 14.6$, that is, in the case where estimated value $(A/F)_s$ of the air-fuel ratio of exhaust gas is rich, the program advances to step 607 and the air pump 18 is turned off. In the case of $(A/F)_s \geq 14.6$, that is, in the case where estimated value $(A/F)_s$ of the air-fuel ratio of exhaust gas is lean or the same as the theoretical value, the program advances to step 615 and the air pump 18 is turned on. Next, the program advances to step 616, and it is discriminated whether or not a predetermined period of time, for example, 0.5 second has passed after the air pump 18 was turned on. In the case where the predetermined period of time has not passed, the program advances to step 608 and the shut-off valve 19 continues to be in a closed condition. In the case where the predetermined period of time has passed, the program advances to step 617 and the shut-off valve 19 is opened by the switching action of the changeover valve 23. That is, the program waits for an increase of discharging pressure of the air pump 18 after it was turned on, and when the discharging pressure of the air pump 18 is increased, the shut-off valve 19 is opened and the supply of secondary air starts.

When it has been discriminated in step 604 that $GA > GI_{max}$, the program advances to step 605 and permission flag XP is reset. When the permission flag is reset, the program advances from step 613 to step 607, and the air pump 18 is turned off. Next, since the shut-off valve 19 is closed in step 608, the supply of secondary air is stopped.

Figure 22:
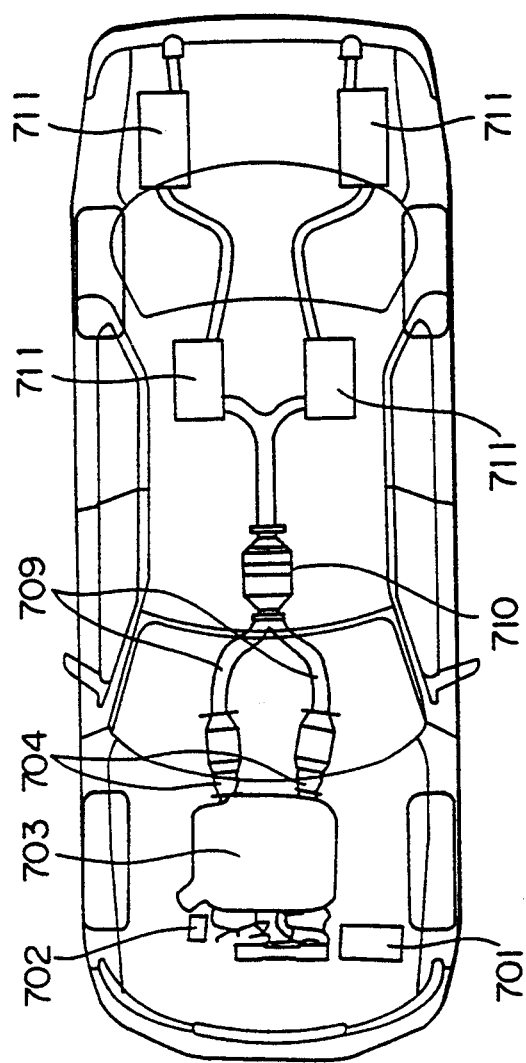
FIG. 22 is a view showing the bottom surface of an automobile to which the present invention is applied.

FIG. 22 is a bottom view of an automobile to which the present invention is applied. Numeral 701 is a battery, and numeral 702 is an alternator. FIG. 22 shows an example in which the exhaust manifolds are provided on both banks. In this case, in order to effectively receive exhaust gas energy, each catalytic converter (electrically heated catalyst) 704 is disposed at a position close to the exhaust manifold. In this connection, in FIG. 22, numeral 709 is an exhaust gas manifold, numeral 710 is a primary catalytic converter, and numeral 711 is a muffler.

Figure 23:
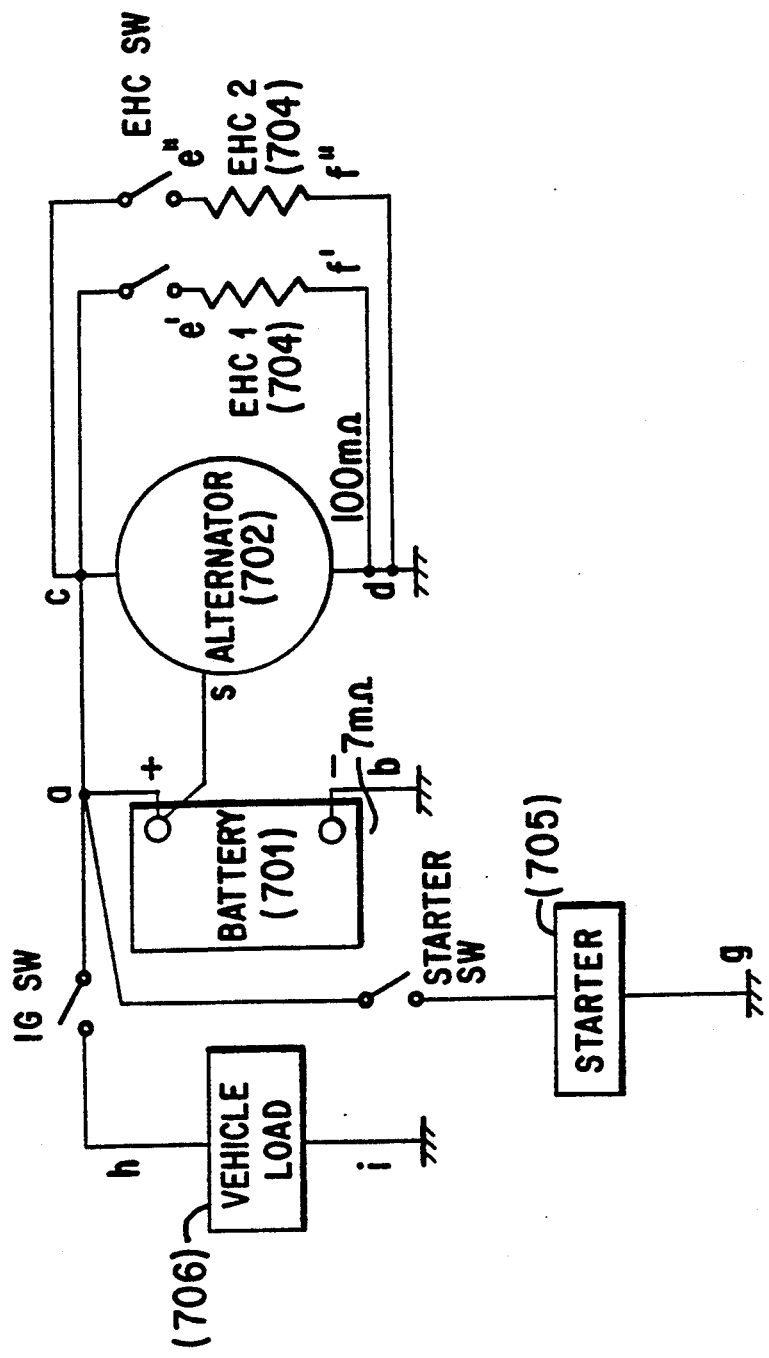
FIG. 23 is a circuit block diagram showing the embodiment of the present invention.

FIG. 23 is a block diagram of this embodiment. In FIG. 23, an electric circuit is shown, in which the battery 701 and alternator 702 are connected with an electrically heated catalyst (EHC) 704, starter 705, and vehicle load 706. Electric power is supplied to the electrically heated catalyst (EHC) 704 through output terminals c, d of the alternator 702 separate from terminals a, b of the battery 701 of which the internal resistance is low. An amount of current which flows in the electrically heated catalyst 704 (terminals of the catalyst are e', e'', f' and f'') is the total of currents which flow out from the alternator 702 and the battery 701. That is, when the electrically heated catalyst 704 is energized, electric power generated by the battery and alternator is supplied to the electrically heated catalyst 704. According to this circuit construction, while the electric power generated by the alternator is maintained high, an amount of current which flows out from the battery is reduced.

Figure 24:
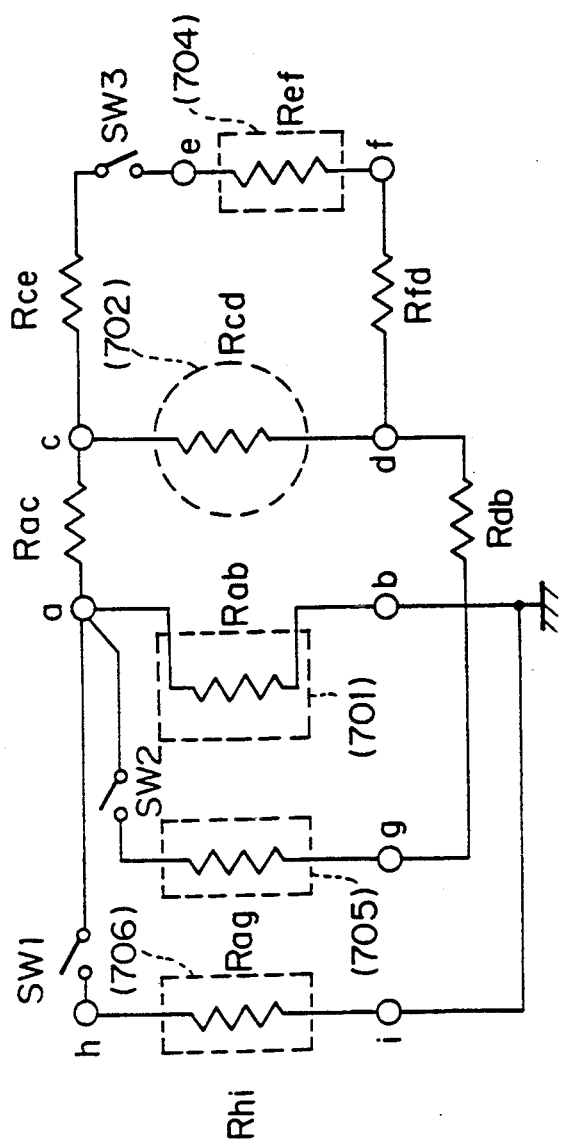
FIG. 24 is an equivalent circuit diagram of the circuit block diagram shown in FIG. 23.

FIG. 24 is an equivalent circuit diagram in which the two electrically heated catalysts 704 in FIG. 23 are shown in the form of one unit, and also equivalent resistances of the battery 701 and alternator 702 are shown.

Rab is an equivalent internal resistance of the battery 701. The equivalent internal resistance Rab depends on the battery size and condition. For example, when the battery is of the size of a standard (95D31L), the internal resistance is approximately 7 m$\Omega$. Rcd is an equivalent internal resistance of the alternator 702. Resistance of the alternator 702 depends on the output capacity. In the example shown in FIG. 26 which will be described later, the equivalent internal resistance of an alternator, the output capacity of which is 140A, is approximately 100 m$\Omega$. The equivalent internal resistance of the alternator 702 is relatively high compared with the equivalent internal resistance of the battery 701. Therefore, when the battery 701 and alternator 702 are connected in parallel, a current flowing out from the battery 701 tends to increase.

SW1 is an ignition switch (IGSW). In the circuit diagram shown in FIG. 24, the total of all electric loads except for the electrically heated catalyst, for example, the total of electric loads such as ignition (IG), stop lamp and electrically operated air pump (EAP) is expressed by vehicle load Rhi.

SW2 is a starter switch, and the starter load of the engine is expressed by Rag. Electric circuits a, h, i, b and g are not directly concerned with the present invention. Therefore, the explanations will be omitted here.

The battery 701 (Rab) and alternator 702 (Rcd) are connected in such a manner that the positive sides of the battery 701 (Rab) and alternator 702 (Rcd) are connected through equivalent resistance Rac, and the negative sides are connected through body earth resistance Rdb. In this case, Rac and Rdb includes the connection resistance of terminals and the resistance of electric conductors.

Ref is an equivalent resistance of the electrically heated catalyst (EHC) 704, and turned on and off by a relay switch (SW3). The electrically heated catalyst 704 is connected with the alternator 702 in such a manner that the positive sides of the catalyst 704 and the alternator 702 are connected through a wire of which the resistance is Rce, and the negative sides are connected through a wire of which the resistance is Rfd. In FIGS. 1 and 2, two units of catalysts 704 are shown, however, in FIG. 3, the two units of electrically heated catalysts 704 are combined into one unit, and the equivalent resistance is expressed by Ref.

Figure 25:
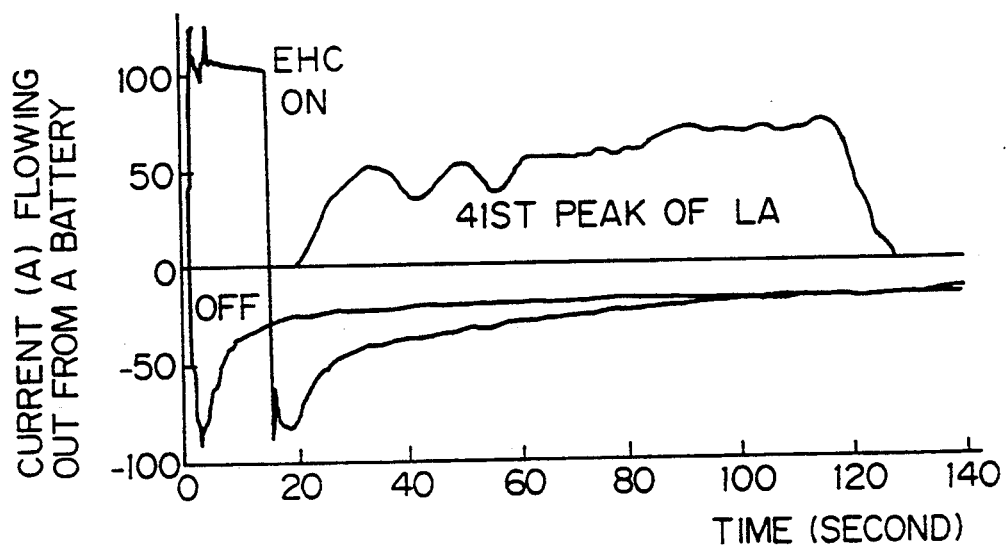
FIG. 25 is a diagram showing a change in current at the battery terminal in the case where the electrically heated catalyst is turned on and off.

FIG. 25 is a graph showing a change in the current measured at the terminal of the battery 701 in two cases, one is a case in which the electrically heated catalyst 704 is used (EHC.ON), and the other is a case in which the electrically heated catalyst 704 is not used (EHC.-OFF). In the case where the electrically heated catalyst 704 is turned off, a current flows out from the battery 701 when the starter 705 is driven. After the start of the engine, the battery 701 is charged by electric power generated by the alternator 702. Since the battery 701 is charged by the alternator 702, electric power is supplied to the vehicle loads by the alternator 702. On the other hand, the electrically heated catalyst 704 is turned on after the start of the engine. In this case, all electric power required for the catalysts 704 cannot be supplied by the alternator 702, so that a current flows out from the battery 701 so as compensate a shortage.

FIG. 26 is a schematic illustration showing a balance of current including the battery 701 and the alternator 702 when 10 seconds have passed after the start of the engine of an automobile provided with the electrically heated catalyst. In this case, two electrically heated catalysts (EHC) are used, wherein the rated capacity of each electrically heated catalyst is 1 KW, so that the two electrically heated catalysts consume 190 (250−60) A. Other automobile loads such as ignition (IG), stop lamp (STOP), electrically operated air pump (EAP), and relays consume 60 A. At this time, the output of the alternator 702 is 100%, so that the alternator 702 generates a current of 140 A. Therefore, a shortage of the alternator capacity, which is 110 (250−140) A, is supplied from the battery 701.

When a large amount of electric power is required for the electrically heated catalyst (EHC) 704, the alternator 702 can not meet the demand, so that an amount of electric power corresponding to the shortage is supplied from the battery 701.

However, in the case where the amount of electric power required for the electrically heated catalyst (EHC) 704 is low, for example, in the case where the electrically heated catalyst (EHC) is composed of 0.75 KW×2 units, the current consumption can be reduced by 50 A compared with a case in which the electrically heated catalyst (EHC) is composed of 1 KW×2 units. According to the electric circuit shown in FIGS. 23 and 24, while the output current of the alternator 702 is maintained at 140 A, a current supplied from the battery 701 is reduced by 50 A from 110 A to 60 A, because electric power consumed by the electrically heated catalyst (EHC) is reduced by 50 A.

In order to reduce the power consumption of the electrically heated catalyst (EHC) 704 as described above, an output of the alternator 702 may be controlled irrespective of the condition of the battery 701 when S-terminals (shown in FIG. 23) of the alternator 702 are controlled. However, it is more preferable to reduce the electric power by wiring illustrated in FIG. 23. That is, according to the present invention, without conducting a complicated and specific controlling operation on the S-terminals of the alternator 702, the same effect can be provided when the electrically heated catalyst (EHC) 704 is connected to the alternator 702 side as illustrated in FIG. 23.

When the battery 701 is fully charged, the voltage is 13.8 V, that is, 2.3 V×6 cells=13.8 V. However, output voltage of the alternator 702 is not less than 14 V in the case of the rated capacity. Therefore, the voltage between terminals of the alternator 702 is higher than that of the battery 701. Accordingly, it is preferable that the electrically heated catalyst (EHC) 704 is connected to the alternator side because the loss of electric power can be reduced.

When the connection of the electrically heated catalyst (EHC) 704 is changed from cd to ab in FIG. 24, redundant resisters Rac and Rdb are eliminated, so that a current flows from the battery to the vehicle loads and the electrically heated catalyst (EHC) in the case where the electrically heated catalyst (EHC) is heated, and a current generated by the alternator flows into the resistors Rac, Rdb and is supplied to the battery. Therefore, compared with a case in which EHC is connected with Cd, a current generated by the alternator is reduced, and a current outputted by the battery is increased. For this reason, the life of the battery is shortened.

From the reasons described above, an amount of current flowing out from the battery 701 can be reduced by the circuit construction shown in FIGS. 23 and 24.

In this connection, an arrangement of wiring between the battery 701 and the alternator 702 may be the same as that of the conventional example.

It should be understood by those skilled in the art that the foregoing description relates to only preferred embodiments of the disclosed invention, and that various changes and modifications may be made to the invention without departing from the spirit and scope thereof.

We claim:

1. A catalyst warming-up device of an internal combustion engine, said device comprising:
    an electrically heated type catalyst disposed in an exhaust gas passage of said engine;
    a secondary air supplying means for supplying secondary air into said exhaust gas passage at an upstream of said catalyst;
    a catalyst energizing means for energizing said catalyst with an electric current;
    an air-fuel ratio detecting means for detecting an air-fuel ratio of an exhaust gas in said exhaust gas passage;
    controlling means for controlling said secondary air supplying means and said catalyst energizing means in such a manner that, during an engine warming-up condition, in which an air-fuel ratio of a mixture introduced into engine cylinders is controlled to be rich, if the air-fuel ratio of the exhaust gas is detected as lean or the same as a theoretical air-fuel ratio due to the secondary air, the secondary air is supplied to said exhaust gas passage after said catalyst is energized, and if the air-fuel ratio of the exhaust gas cannot be controlled to lean or the same as a theoretical air-fuel ratio, an operation of said catalyst energizating means is stopped.

2. A catalyst warming-up device as set forth in claim 1, wherein said device further comprises a detecting means for detecting an operation of said secondary air supplying means and, if said secondary air supplying means cannot be operated, an operation of said catalyst energizating means is stopped.

3. A catalyst warming-up device as set forth in claim 1, wherein, if the air-fuel ratio of the exhaust gas cannot be controlled to lean or the same as a theoretical air-fuel ratio, even if said secondary air is supplied from said secondary air supplying means into said exhaust gas passage, an operation of said catalyst energizating means is stopped.

4. A catalyst warming-up device of an internal combustion engine of a vehicle:
said engine comprising an electric circuit including a battery and an alternator for supplying electric current to electrical loads of said vehicle and electrically charging said battery;
said catalyst warming-up device comprising:
a catalyst disposed in an exhaust gas passage of said engine;
an electrical heating means for electrically heating said catalyst, said heating means is electrically connected to said electric circuit at a point nearer to said alternator than points at which said electrical loads are connected to said electric circuit, so that more electric current naturally flows from said alternator than from said battery to said heating means.

5. A catalyst warming up device of an internal combustion engine of a vehicle:
said engine comprising an electric circuit including a battery and an alternator for supplying electric current to electrical loads of said vehicle and electrically charging said battery;
said catalyst warming up device comprising:
an electrically heated type catalyst disposed in an exhaust gas passage of said engine;
a secondary air supplying means for supplying secondary air into said exhaust gas passage at an upstream of said catalyst;
a catalyst energizing means for energizing said catalyst with an electric current;
an air-fuel ratio detecting means for detecting an air-fuel ratio of an exhaust gas;
controlling means for controlling said secondary air supplying means and said catalyst energizing means in such a manner that, during an engine warming up condition, in which an air-fuel ratio of an mixture introduced into engine cylinders in controlled to be rich, if the air-fuel ratio of the exhaust gas is detected as lean or the same as a theoretical air-fuel ratio due to the secondary air, the secondary air is supplied to said exhaust gas passage after said catalyst is energized, and if the air-fuel ratio of the exhaust gas cannot be controlled to lean or the same as a theoretical air-fuel ratio, an operation of said catalyst energizating means is stopped; and
said catalyst energizing means being electrically connected to said electric circuit at a point nearer to said alternator than points at which said electrical loads are connected to said electric circuit, so that more electric current is supplied to said heating means from said alternator.

6. A catalyst warming-up device as set forth in claim 4, said electric circuit comprising a first electric connection from said heating means to said battery having a first distance and a second electric connection from said heating means to said alternator having a second distance less than said first distance.

* * * * *